US012502021B2

(12) United States Patent
Rivera

(10) Patent No.: US 12,502,021 B2
(45) Date of Patent: *Dec. 23, 2025

(54) BEVERAGE BREWER WITH HOT- AND COLD-BREW OPTIONS

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 1231 days.

This patent is subject to a terminal disclaimer.

(21) Appl. No.: 17/346,173

(22) Filed: Jun. 11, 2021

(65) Prior Publication Data

US 2022/0160164 A1    May 26, 2022

Related U.S. Application Data

(63) Continuation-in-part of application No. 16/953,742, filed on Nov. 20, 2020, now Pat. No. 12,207,756.

(51) Int. Cl.
*A47J 31/46* (2006.01)
*A47J 31/00* (2006.01)
*A47J 31/053* (2006.01)

(52) U.S. Cl.
CPC .......... *A47J 31/468* (2018.08); *A47J 31/005* (2013.01); *A47J 31/053* (2013.01)

(58) Field of Classification Search
CPC ...... A47J 31/468; A47J 31/005; A47J 31/053; A47J 31/0642; A47J 31/446
USPC .................................................. 99/295, 303
See application file for complete search history.

(56) References Cited

U.S. PATENT DOCUMENTS

| 834,430 | A | 10/1906 | Wightman et al. |
| 2,350,335 | A | 6/1944 | Baker |
| 2,570,997 | A | 10/1951 | Willman |
| 3,396,654 | A | 8/1968 | Folke |
| 3,469,522 | A | 9/1969 | Prosen |
| 4,205,598 | A * | 6/1980 | Leuschner .......... A47J 31/0573 99/307 |
| 6,526,872 | B2 * | 3/2003 | Wong .................... A47J 31/053 99/308 |
| 9,743,796 | B2 | 8/2017 | Richardson |
| 9,743,797 | B2 | 8/2017 | Richardson |

(Continued)

FOREIGN PATENT DOCUMENTS

| CA | 2989054 A1 | 12/2016 |
| CN | 206314985 U | 7/2017 |

(Continued)

*Primary Examiner* — Reginald Alexander
(74) *Attorney, Agent, or Firm* — IP Strategies

(57) ABSTRACT

A beverage brewer includes a pump, a container, an intake channel, an outflow channel, and a brewing material holder. The pump has inlet and outlet ports to provide negative fluid pressure at the inlet port and positive fluid pressure at the outlet port. The intake channel provides fluid communication between an interior of the container and the inlet port. The outflow channel provides fluid communication between the outlet port and the interior of the container. The brewing material holder is configured to hold ground brewing material and is arranged at an issue end of the outflow channel. The pump is configured to draw liquid from the interior of the container through the intake channel and to issue the liquid to the brewing material holder through the outflow channel, thereby brewing a beverage. The brewing material holder is configured to issue the brewed beverage into the interior of the container.

18 Claims, 25 Drawing Sheets

(56) References Cited

U.S. PATENT DOCUMENTS

| | | |
|---|---|---|
| 10,219,647 B2 | 3/2019 | Richardson |
| 10,231,568 B2 | 3/2019 | Richardson |
| 10,980,369 B2 | 4/2021 | Glucksman |
| 11,246,445 B2 | 2/2022 | Richardson |
| 11,559,166 B2 | 1/2023 | Grosman et al. |
| 2002/0029694 A1 | 3/2002 | Wong |
| 2009/0246341 A1 | 10/2009 | Pitner et al. |
| 2012/0269025 A1 | 10/2012 | Liu |
| 2015/0000533 A1 | 1/2015 | Ha et al. |
| 2015/0027315 A1 | 1/2015 | Lussi et al. |
| 2015/0068404 A1 | 3/2015 | Rivera |
| 2017/0290354 A1 | 10/2017 | Pabst et al. |
| 2018/0116444 A1 | 5/2018 | Rivera |
| 2018/0263403 A1 | 9/2018 | Richardson |
| 2018/0368612 A1 | 12/2018 | Stein |
| 2019/0191913 A1 | 6/2019 | Richardson |
| 2020/0054161 A1 | 2/2020 | Zhu |
| 2021/0219766 A1 | 7/2021 | Glucksman |
| 2022/0125234 A1 | 4/2022 | Richardson |

FOREIGN PATENT DOCUMENTS

| | | |
|---|---|---|
| CN | 206403624 U | 8/2017 |
| CN | 206560336 U | 10/2017 |
| CN | 107788844 A | 3/2018 |
| CN | 108158401 A | 6/2018 |
| CN | 109528005 A | 3/2019 |
| WO | 2010041003 A1 | 4/2010 |
| WO | 2012090126 A1 | 7/2012 |
| WO | 2012160482 A1 | 11/2012 |
| WO | 2018119162 A1 | 6/2018 |
| WO | 2018148828 A1 | 8/2018 |

* cited by examiner

BEVERAGE BREWER WITH HOT- AND COLD-BREW OPTIONS

CROSS-REFERENCE TO RELATED APPLICATION

This is a continuation-in-part of co-pending U.S. patent application Ser. No. 16/953,742, which was filed on Nov. 20, 2020, which is also related to, and claims priority from, U.S. Provisional Application for Patent No. 62/939,128, which was filed on Nov. 22, 2019; which in turn is a continuation-in-part of co-pending U.S. patent application Ser. No. 16/290,537, which was filed on Mar. 1, 2019, which is related to, and claims priority from, U.S. Provisional Application for Patent No. 62/773,685, which was filed on Nov. 30, 2018, the entire disclosures of all of which are incorporated herein by this reference.

FIELD OF THE INVENTION

The present invention relates to beverage brewing and in particular to a brewing device for hot or cold brewing of beverages.

BACKGROUND OF THE INVENTION

Several types of beverages, such as coffee, tea, yerba mate, and herbal infusions (tisane), are brewed by infusing or steeping ground or shredded beverage material in water or other liquid. For quick brewing, hot water is typically used. However, cold brewing, that is, infusion of the beverage material in cold or room-temperature water rather than in hot water, is sometimes preferred. For example, some coffee drinkers prefer the flavor provided by cold brewing, and bitterness and acidity can be avoided when brewing certain teas by steeping in unheated water rather than hot water. Such cold brewing is accomplished by submerging a portion of brewing material in unheated water for a period of time to allow the brewing material to infuse the water. While the steeping process may provide a desired result, the time required for cold brewing is longer than that required for brewing in hot water.

Conventional cold-brew steeps require a user to measure and pour a particular amount of brewing material into the steep liquid. A pre-measured simple drop-in portion of brewing material would be convenient, particularly for use in a brewer that simplifies removal of the brewing material and clean-up of the brewer. A brewer that can be used for both hot- and cold-brewing would provide flexibility, and it would be advantageous if the brewer would be configured to speed the cold-brewing process. The ability to use either loose beverage brewing material or pre-packaged brewing material in a capsule or other container would make such a brewer universally useful.

It would also be advantageous to provide a feature by which the brewing time is reduced when the beverage is cold-brewed. Many people prefer the taste of a cold-brewed beverage, but cold-brewing typically takes a much longer time than does traditional hot-brewing. Adding an agitation or rotation feature to the cold brewer has been shown to reduce the cold-brewing time. Another manner of speeding the process would be to increase the flow of brewing liquid through the brewing material. Some conventional devices use a gravity feed to draw water through the brewing material using a percolator-type action, which speeds brewing time somewhat. However, these systems tend to have a motorized system outside the brewing container to provide the gravity action, resulting in a brewer having a large footprint that takes up considerable counter space. Also, the complexity of these systems makes them difficult to clean properly and exposes users to potential build-up of bacteria and other contaminants that affect the taste of the beverage and the health of the user. Other systems use a reservoir container to provide the water to be used to brew the beverage, and a separate container to dispense the brewed beverage, adding size and complexity to the device.

Therefore, a reliable, rapid cold-brewing system that uses a fluid feed to increase the fluid flow would provide an overall improved brewing experience. It would also be advantageous if such a system could be configured as a compact unit, preferably a unit that could be portable. Flexibility would be provided if the brewing system can also be used to hot-brew a beverage, or if it can be used to warm a beverage that had been cold-brewed by the system, in order to serve a warm or hot beverage that has the cold-brew taste. Such a system that uses the beverage serving vessel as the source of the fluid used to brew the beverage would make the unit more compact and simple to use and clean. A system having a simple feature allowing the brew line to be cleaned quickly between brews would reduce the potential for pathogen buildup, would make it easier to brew beverages of different types with the same system without cross-flavoring the beverages, and would keep the brewed beverages fresher tasting.

BRIEF SUMMARY OF THE INVENTION

According to an aspect of the invention, a beverage brewer includes a pump assembly, an intake tube assembly, an outflow tube assembly, a brewing material holder assembly, and a container volume. The intake tube assembly is connected to an inlet port of the pump assembly at a pump end. The outflow tube assembly is connected to an outlet port of the pump assembly at a pump end. The brewing material holder assembly is configured to hold ground brewing material and is arranged at an issue end of the outflow tube assembly. The container volume is configured to accommodate a container assembly that is configured to hold fluid, and is arranged at an issue portion of the brewing material holder assembly. A suction end of the intake tube assembly is arranged within an interior of the container volume. The pump assembly is configured to draw fluid from within the container volume through the intake tube assembly and to issue the fluid into the brewing material holder assembly through the outflow tube assembly, thereby brewing a beverage in the brewing material holder assembly. The brewing material holder assembly is configured to issue the brewed beverage into the container volume.

The beverage brewer can also include a container assembly, configured to be disposed in the container volume.

The beverage brewer can also include a heating element, disposed below the container volume.

The brewing material holder assembly can be arranged below the outflow tube assembly, and the container volume can be arranged below the brewing material holder assembly.

According to another aspect of the invention, a beverage brewer includes a pump assembly, an intake tube assembly, an outflow tube assembly, a brewing material holder assembly, an air vent tube assembly, and a container volume. The intake tube assembly is connected to an inlet port of the pump assembly at a pump end. The outflow tube assembly is connected to an outlet port of the pump assembly at a pump end. The brewing material holder assembly is configured to hold ground brewing material and is arranged at an issue end of the outflow tube assembly. The air vent tube assembly is coupled to the intake tube assembly and configured to selectively allow air to vent to an interior of the intake tube assembly. The container volume is configured to accommodate a container assembly that is configured to hold fluid, and is arranged at an issue portion of the brewing material holder assembly. The pump assembly is configured to draw fluid through the intake tube assembly and to issue the fluid into the brewing material holder assembly through the outflow tube assembly, thereby brewing a beverage in the brewing material holder assembly. The brewing material holder assembly is configured to issue the brewed beverage into the container volume.

The air vent tube assembly can include an air vent tube and an air vent tube valve, the intake tube assembly can include an inlet tube, and the air vent tube valve can be controllable to selectively allow or prevent fluid communication between an interior of the air vent tube and an interior of the inlet tube. The air vent tube valve can be biased in a closed position, thereby preventing fluid communication between the interior of the air vent tube and the interior of the inlet tube, and can be controllable to counteract the bias into an open position, thereby allowing fluid communication between the interior of the air vent tube and the interior of the inlet tube.

According to another aspect of the invention, a beverage brewer includes a frame, a holder assembly, an intake tube having a proximal end and a distal end, an inlet tube having a proximal end and a distal end, an outlet tube having a proximal end and a distal end, and a pump assembly coupled to the frame, having an inlet port and an outlet port. The proximal end of the intake tube is arranged at a first frame through-hole. The distal end of the inlet tube is coupled to the frame and is arranged in fluid communication with the proximal end of the intake tube at the first frame through-hole. The proximal end of the inlet tube is coupled to the inlet port of the pump assembly. The proximal end of the outlet tube is coupled to the outlet port of the pump assembly. The distal end of the outlet tube is arranged at a second frame through-hole. The pump assembly is configured to draw fluid from the distal end of the intake tube through the intake tube and the inlet tube, and to issue the drawn fluid through the outlet tube. The holder assembly is configured to be arranged to receive the issued fluid from the outlet tube.

The distal end of the intake tube can be arranged at a level below the holder assembly.

The intake tube can be made from a flexible material.

The intake tube can have a bowed shape.

The beverage brewer can also include an intake tube filter attached to the distal end of the intake tube and configured to filter particulate matter from fluid.

The pump assembly can include a pump, and a motor configured to drive the pump.

The frame can include a base, an extension, and a support chassis. The base can be configured to be placed on a surface so as to maintain the beverage brewer in a stable state. The extension can be configured to be coupled to and extend upward from the base at a lower end, and to be coupled to the support chassis at an upper end, thereby maintaining the support chassis in spaced relation above the base. The pump assembly can be coupled to the frame at the support chassis. The proximal end of the intake tube can be coupled to the frame at the support chassis. The distal end of the inlet tube can be coupled to the frame at the support chassis. The first and second frame through-holes can be arranged in the support chassis.

The extension can be configured at least in part as a handle. The support chassis can be hingedly coupled to the extension. The beverage brewer can also include a support collar, coupled to an upper end of the extension and configured to support the support chassis.

The holder assembly can include an upper holder rim, a holder bottom, and a holder sidewall connecting the upper rim to the holder bottom. The holder bottom can include a holder bottom aperture.

The beverage brewer can also include an outflow needle coupled within the holder bottom aperture and extending into an interior of the holder assembly, and an inflow needle coupled within the second frame through-hole and extending away from the distal end of the outlet tube. The outflow and inflow needles can be, for example, tubes having a sharp end. The distal end of the outlet tube can be arranged for fluid communication with the inflow needle through the second frame through-hole. Thus, the holder assembly can be configured to receive a sealed container of ground brewing material. In this case, the inflow needle is configured to pierce an upper seal of the sealed container of ground brewing material when the holder assembly is arranged to receive the issued fluid from the outlet tube, and to provide the issued fluid to an interior of the sealed container, thereby brewing a beverage, and the outflow needle is configured to pierce a bottom of the sealed container of ground brewing material when the holder assembly is arranged to receive the issued fluid from the outlet tube, and to issue the brewed beverage.

Alternatively, the beverage brewer can include a bottom tube coupled within the holder bottom aperture and extending into an interior of the holder assembly, and an upper tube coupled within the second frame through-hole and extending toward the base. The distal end of the outlet tube can be arranged for fluid communication with the upper tube through the second frame through-hole. Thus, the holder assembly can be configured to receive a reusable container containing ground brewing material. Such a reusable container includes an upper container rim, a container bottom having a container bottom aperture, a container sidewall connecting the upper rim to the bottom, and a lid configured to be removably coupled to the upper container rim and having a lid aperture. The upper tube can be configured to enter an interior of the reusable container through the lid aperture when the holder assembly is arranged to receive the issued fluid from the outlet tube, and to provide the issued fluid to the interior of the reusable container, thereby brewing a beverage, and the bottom tube can be configured to enter the interior of the reusable container through the container bottom aperture when the holder assembly is arranged to receive the issued fluid from the outlet tube, and to issue the brewed beverage. Alternatively, the holder assembly can be configured to hold ground brewing material directly. In this case, the upper tube can be configured to enter an interior of the holder assembly upper holder rim when the holder assembly is arranged to receive the issued fluid from the outlet tube, and to provide the issued fluid to the interior of the holder assembly, thereby brewing a beverage, and the bottom tube can be configured to enter the interior of the holder assembly through the holder bottom aperture when the holder assembly is arranged to receive the issued fluid from the outlet tube, and to issue the brewed beverage.

The beverage brewer can instead include an upper tube coupled within the second frame through-hole and extending toward the base. In this case, the distal end of the outlet tube can be arranged for fluid communication with the upper tube through the second frame through-hole. The holder sidewall can include a plurality of ribs connected at opposite ends between the upper holder rim and the holder bottom. The plurality of ribs and corresponding spaces between the ribs define the holder sidewall, and the holder assembly can include mesh material at least partially covering the spaces between the ribs in the holder sidewall. The holder assembly can be configured to hold ground brewing material. The upper tube can be configured to enter an interior of the upper holder rim when the holder assembly is arranged to receive the issued fluid from the outlet tube, and to provide the issued fluid to the interior of the holder assembly, thereby brewing a beverage. The mesh material can be configured to issue the brewed beverage. The holder bottom can include open areas corresponding to the spaces between the ribs in the holder sidewall, and the mesh material can at least partially covers the open areas.

The beverage brewer can also include a container assembly, configured to receive and hold fluid and to be arranged on the base below the holder assembly such that the distal end of the intake tube is disposed within an interior of the container assembly. The container assembly can include a container body, and a container collar. The container body can include an open upper container rim, a container bottom, and a container sidewall connecting the upper container rim to the container bottom. The container collar can include an open upper collar rim, an open bottom collar rim, and a collar sidewall connecting the upper collar rim to the bottom collar rim. The bottom collar rim can correspond to and be coupled to the upper container rim. The holder assembly can also include a holder plate extending outward from the holder sidewall. The holder plate can be configured to couple with an inside surface of the container collar such that the holder assembly is arranged within the collar sidewall. The holder plate can include a plate through-hole, and the proximal end of the intake tube can be coupled to the holder plate at the plate through-hole.

The beverage brewer can also include a heating element assembly, including a heating element disposed on the base. The distal end of the intake tube is arranged above the heating element. The heating element assembly can also include a temperature sensor configured to measure a temperature value corresponding to a temperature of fluid held in a container assembly arranged on the base below the holder assembly such that the distal end of the intake tube is disposed within an interior of the container assembly. The heating element assembly can also include a heating element controller configured to receive the temperature value and to adjust a relative temperature provided by the heating element based on the temperature value.

The beverage brewer can also include a support chassis cover, hingedly connected to the upper end of the extension and configured to alternately cover and uncover the pump assembly, the inlet tube, the outlet tube, and the support chassis.

The beverage brewer can also include an air vent tube assembly, coupled to the inlet tube at a first end and configured to selectively allow air at a second end to vent to an interior of the inlet tube. The air vent tube assembly can include an air vent tube and an air vent tube valve. The air vent tube valve can be controllable to selectively allow or prevent fluid communication between an interior of the air vent tube and an interior of the inlet tube. The air vent tube valve can be, for example, biased in a closed position, thereby preventing fluid communication between the interior of the air vent tube and the interior of the inlet tube, and can be controllable to counteract the bias into an open position, thereby allowing fluid communication between the interior of the air vent tube and the interior of the inlet tube.

According to another aspect of the invention, a beverage brewer includes pressure means for providing fluid suction at an intake port and corresponding fluid discharge at an outflow port, intake means for providing intake fluid passage, connected to the intake port of the pressure means at a pressure end, outflow means for providing outflow fluid passage, connected to the outflow port of the pressure means at a pressure end, material holding means for containing ground brewing material, arranged at an issue end of the outflow means, and fluid holding means for containing a fluid, arranged at an issue portion of the material holding means. A suction end of the intake means is arranged within an interior of the fluid holding means. The pressure means is configured to draw fluid from within the fluid holding means through the intake means and to issue the fluid into the material holding means through the outflow means, thereby brewing a beverage in the material holding means. The material holding means is configured to issue the brewed beverage into the fluid holding means.

According to another aspect of the invention, a beverage brewer includes pressure means for providing fluid suction at an intake port and corresponding fluid discharge at an outflow port, intake means for providing intake fluid passage, connected to the intake port of the pressure means at a pressure end, outflow means for providing outflow fluid passage, connected to the outflow port of the pressure means at a pressure end, material holding means for containing ground brewing material, arranged at an issue end of the outflow means, air venting means, coupled to the intake means and configured to selectively allow air to vent to an interior of the intake means, and fluid holding means for containing a fluid, arranged at an issue portion of the material holding means. The pressure means is configured to draw fluid through the intake means and to issue the fluid into the material holding means through the outflow means, thereby brewing a beverage in the material holding means. The material holding means is configured to issue the brewed beverage into the fluid holding means.

According to another aspect of the invention, a beverage brewer includes a container, a pump configured to provide liquid suction at a suction port and corresponding liquid discharge at an outflow port, an intake line connected to the suction port of the pump and configured to transport liquid from the container to the pump, an outflow line connected to the outflow port of the pump and configured to provide liquid from the pump to an end of the outflow line, and a brewing material holder, arranged at the end of the outflow line and configured to contain ground brewing material and to brew a beverage from the liquid provided by the outflow line. The container is arranged to receive the beverage brewed at the brewing material holder.

According to another aspect of the invention, a beverage brewer includes a container, a pump configured to provide liquid suction at a suction port and corresponding liquid discharge at an outflow port, an intake line connected to the suction port of the pump and configured to transport liquid from the container to the pump, an outflow line connected to the outflow port of the pump and configured to provide liquid from the pump to an end of the outflow line, a brewing material holder, arranged at the end of the outflow line, configured to contain ground brewing material and to brew a beverage from the liquid provided by the outflow line, and an air vent tube, coupled to the intake line and configured to selectively allow ambient air to vent to an interior of the intake line by suction action of the pump.

According to another aspect of the invention, a beverage brewer includes a pump assembly, an intake tube assembly, an outflow tube assembly, a brewing material holder assembly, and a container assembly. The intake tube assembly is connected to an inlet port of the pump assembly at a pump end. The outflow tube assembly is connected to an outlet port of the pump assembly at a pump end. The brewing material holder assembly is configured to hold ground brewing material and is arranged at an issue end of the outflow tube assembly. The container assembly is configured to hold fluid and is arranged at an issue portion of the brewing material holder assembly. A suction end of the intake tube assembly is arranged for fluid communication with an interior of the container volume. The pump assembly is configured to draw fluid from within the container volume through the intake tube assembly and to issue the fluid into the brewing material holder assembly through the outflow tube assembly, thereby brewing a beverage in the brewing material holder assembly. At least a portion of the intake tube assembly is attached to the container assembly. The brewing material holder assembly is configured to issue the brewed beverage into the container volume.

The portion of the intake tube assembly can be attached to an inside surface of the container assembly.

The container assembly can include a port allowing fluid communication between the interior of the container assembly and outside the container assembly. The portion of the intake tube assembly can be coupled to the container assembly outside of the container volume. The suction end of the intake tube assembly can be arranged at the container assembly port. The portion of the intake tube assembly can be coupled to an outside surface of the container assembly, and the pump assembly can be coupled to the outside surface of the container assembly. The container assembly can include a handle, which can include a hollow internal channel forming a portion of the intake tube assembly. Alternatively, the handle can include a hollow internal channel in which the at least a portion of the intake tube assembly is arranged. The pump assembly can be arranged in the handle.

According to another aspect of the invention, a beverage brewer includes a pump assembly, an intake tube assembly, an outflow tube assembly, a brewing material holder assembly, and a container volume. The intake tube assembly is connected to an inlet port of the pump assembly at a pump end. The outflow tube assembly is connected to an outlet port of the pump assembly at a pump end. The brewing material holder assembly is configured to hold ground brewing material and arranged at an issue end of the outflow tube assembly. The container volume is configured to accommodate a container assembly that is configured to hold fluid, arranged at an issue portion of the brewing material holder assembly. A suction end of the intake tube assembly is arranged within an interior of the container volume. The pump assembly is configured to draw fluid from within the container volume through the intake tube assembly and to issue the fluid into the brewing material holder assembly through the outflow tube assembly, thereby brewing a beverage in the brewing material holder assembly. At least a portion of the intake tube assembly is attached to the brewing material holder assembly. The brewing material holder assembly is configured to issue the brewed beverage into the container volume.

According to another aspect of the invention, a beverage brewer includes a pump assembly, an intake tube assembly, an outflow tube assembly, a brewing material holder assembly, a container volume, and a control assembly. The intake tube assembly is connected to an inlet port of the pump assembly at a pump end. The outflow tube assembly is connected to an outlet port of the pump assembly at a pump end. The brewing material holder assembly is configured to hold ground brewing material and arranged at an issue end of the outflow tube assembly. The container volume is configured to accommodate a container assembly that is configured to hold fluid, arranged at an issue portion of the brewing material holder assembly. A suction end of the intake tube assembly is arranged within an interior of the container volume. The pump assembly is configured to draw fluid from within the container volume through the intake tube assembly and to issue the fluid into the brewing material holder assembly through the outflow tube assembly, thereby brewing a beverage in the brewing material holder assembly. The brewing material holder assembly is configured to issue the brewed beverage into the container volume. The control assembly is configured to selectively actuate the pump assembly.

The control assembly can include a user interface configured to accept brew parameters provided by a user. The user interface can be configured to accept a brew parameter associated with desired brew strength. The control assembly can also be configured to selectively control a duration of pump assembly actuation and/or a pump assembly flow rate. The beverage brewer can also include the container assembly, and can also include a volume detector configured to determine a volume of liquid present within the container assembly. For example, the volume detector can include one of the brew parameters provided by the user via the user interface. The control assembly can be configured to selectively control at least one of duration of pump assembly actuation and pump assembly flow rate based at least in part on the determined volume of liquid.

The beverage brewer can also include a heating element, disposed below the container volume. The control assembly can be configured to selectively control a duration of heating element actuation and a heating element temperature.

According to another aspect of the invention, a beverage brewer includes a pump assembly, a container assembly, an intake channel, an outflow channel, and a brewing material holder assembly. The pump assembly has an inlet port and an outlet port and is configured to provide negative fluid pressure at the inlet port and positive fluid pressure at the outlet port. The container assembly is configured to hold liquid. The intake channel is arranged to provide fluid communication between an interior of the container assembly and the inlet port of the pump assembly. The outflow channel is arranged to provide fluid communication between the outlet port of the pump assembly and the interior of the container assembly. The brewing material holder assembly is configured to hold ground brewing material and is arranged at an issue end of the outflow channel. The pump assembly is configured to draw liquid from the interior of the container assembly through the intake channel and to issue the liquid to the brewing material holder assembly through the outflow channel, thereby brewing a beverage in the brewing material holder assembly when the brewing material holder assembly holds ground brewing material. The brewing material holder assembly is configured to issue the brewed beverage into the interior of the container assembly.

The intake channel can include an intake tube assembly, connected to the inlet port of the pump assembly at a pump end. A suction end of the intake tube assembly can be arranged for fluid communication with an interior of the container assembly.

The outflow channel can include an outflow tube assembly, connected to the outlet port of the pump assembly at a pump end.

The container assembly can include a container port configured to allow fluid communication between the interior of the container assembly and outside the container assembly. For example, the beverage brewer can also include a dispenser valve assembly arranged at the container port and configured to allow selective flow of liquid from inside the container assembly to outside the container assembly. As another example, the beverage brewer can include a base on which the container assembly is configured to be placed such that the container port provides fluid communication between the interior of the container assembly and an interior of the base. The container port can include an interlock valve configured to open when the container assembly is placed on the base. The base can include a base port configured to allow fluid communication between the interior of the base and outside the base, and a dispenser valve assembly arranged at the base port and configured to allow selective flow of liquid from inside the base to outside the base.

The beverage brewer can also include a dispensing spout and a spout valve. The dispensing spout can be arranged in fluid communication with the outflow channel through the spout valve, and the spout valve can be configured to allow selective flow of liquid from the outflow channel to outside the container assembly.

The beverage brewer can also include a control assembly configured to selectively actuate the pump assembly. The control assembly can include a user interface configured to accept brew parameters provided by a user. For example, the user interface can be configured to accept a brew parameter associated with desired brew strength. The control assembly can also be configured to selectively control a duration of pump assembly actuation and/or a pump assembly flow rate. The beverage brewer can also include a volume detector configured to determine a volume of liquid present within the container assembly. The volume detector can include one of the brew parameters provided by the user via the user interface. The control assembly can be configured to selectively control a duration of pump assembly actuation and/or a pump assembly flow rate based at least in part on the determined volume of liquid. The beverage brewer can also include a heating element, disposed below the container volume. The control assembly can also be configured to selectively control a duration of heating element actuation and/or a heating element temperature.

BRIEF DESCRIPTION OF THE DRAWINGS

These and other aspects, features, and advantages of the present invention will be more apparent from the following more detailed description thereof, with reference to the following drawings wherein.

DETAILED DESCRIPTION OF THE INVENTION

Figure 1:
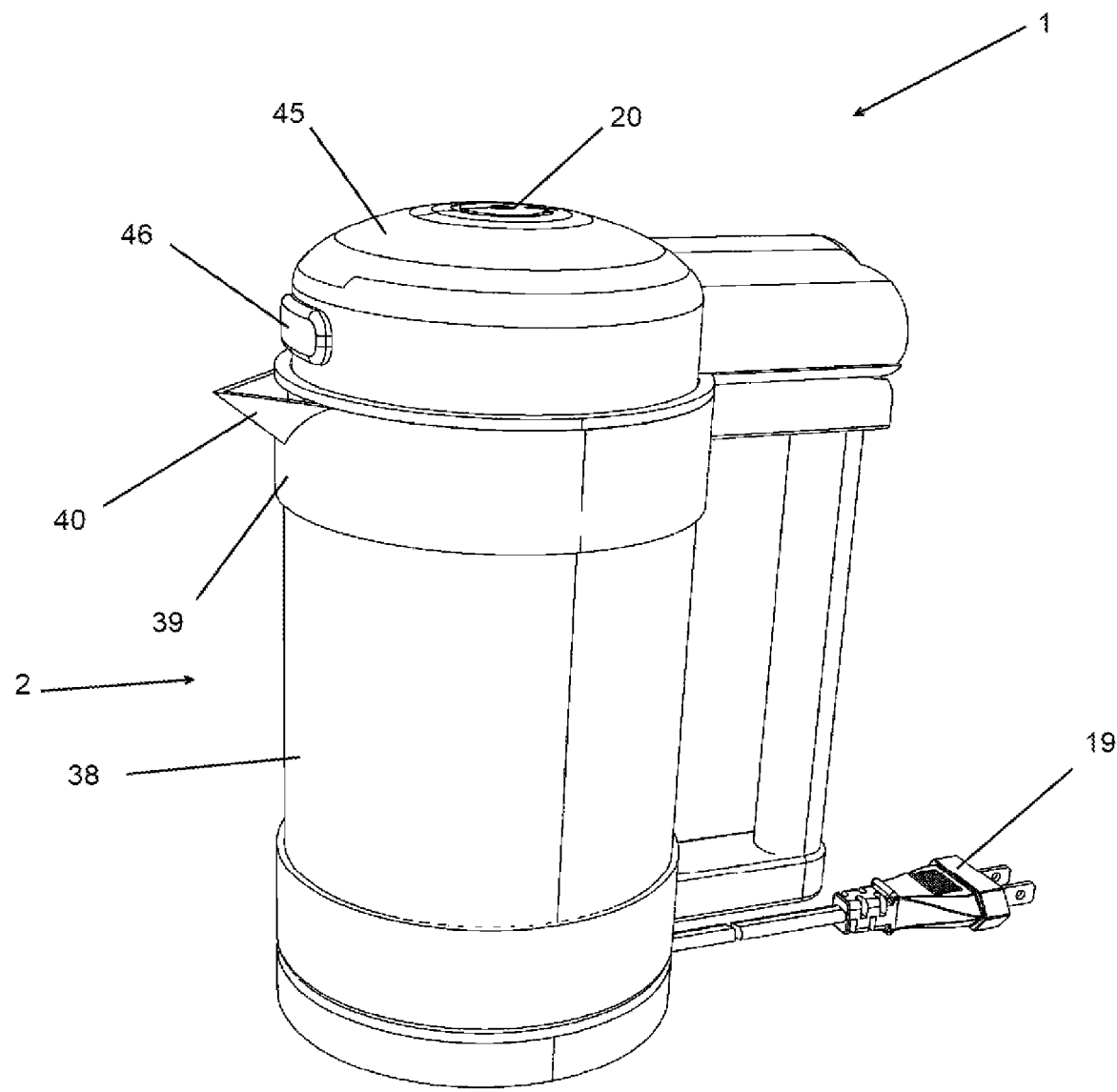
FIG. 1 shows an exemplary embodiment of the beverage brewer of the invention.

Referring to FIG. 1, the invention is a beverage brewer 1, which can be used to brew a beverage from ground or shredded beverage brewing material, such as ground coffee beans, shredded tea leaves, or herbal material. If desired, additional flavorings, such as chicory or ginger, can be added to the materials, which are steeped in water to brew the beverage. The brewer 1 provides the water or other liquid used to brew the beverage from a container assembly 2 or other vessel (cup, mug, carafe, or the like), which is also used to receive the brewed beverage after brewing. Because the same vessel is used to provide the water and receive the brewed beverage, the design of the brewer 1 is compact and efficient, and requires less effort to clean than conventional brewers. Further, brewing can continue for any desired amount of time by continuing to recirculate the brewed beverage through the brewer in order to provide a custom brew strength.

Figure 2:
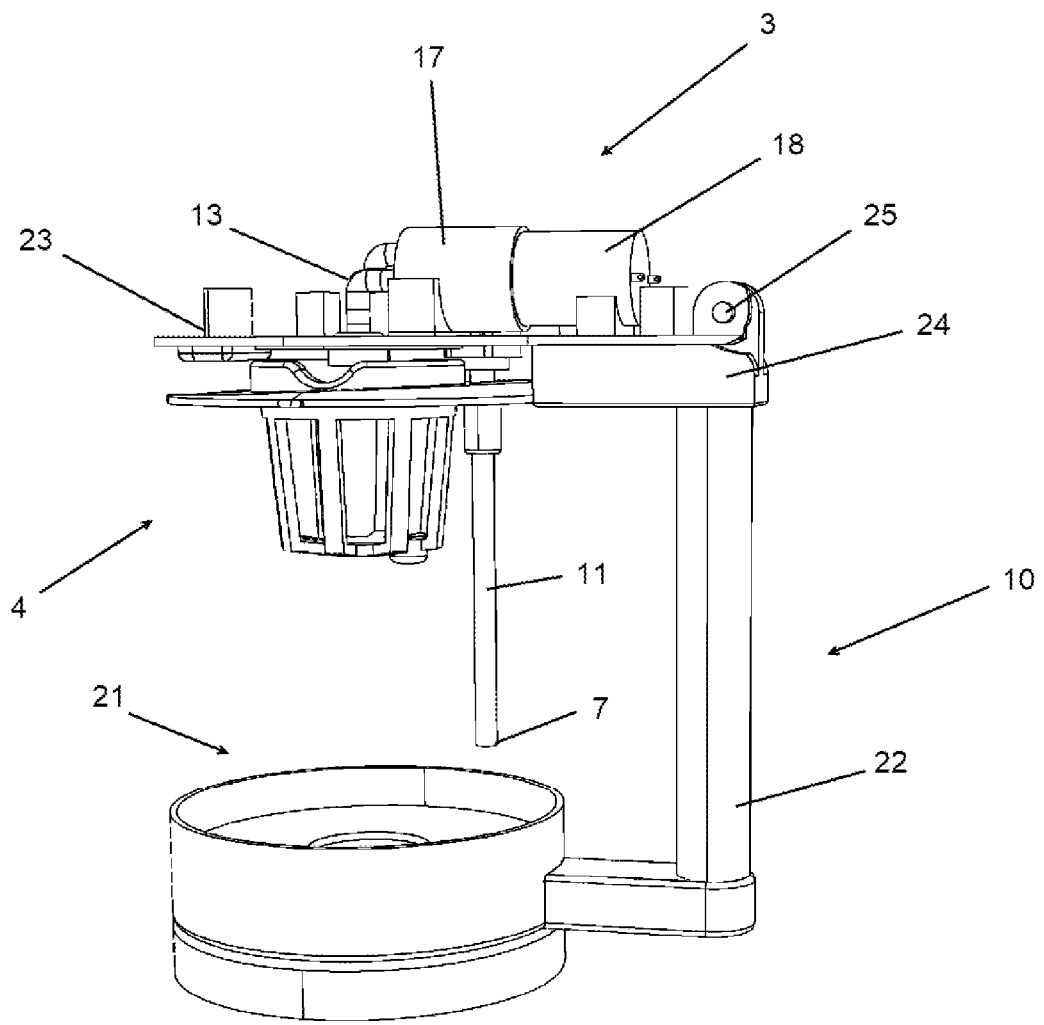
FIG. 2 shows a view of an exemplary embodiment of the beverage brewer of the invention, with the cover and container assembly removed.
Figure 3:
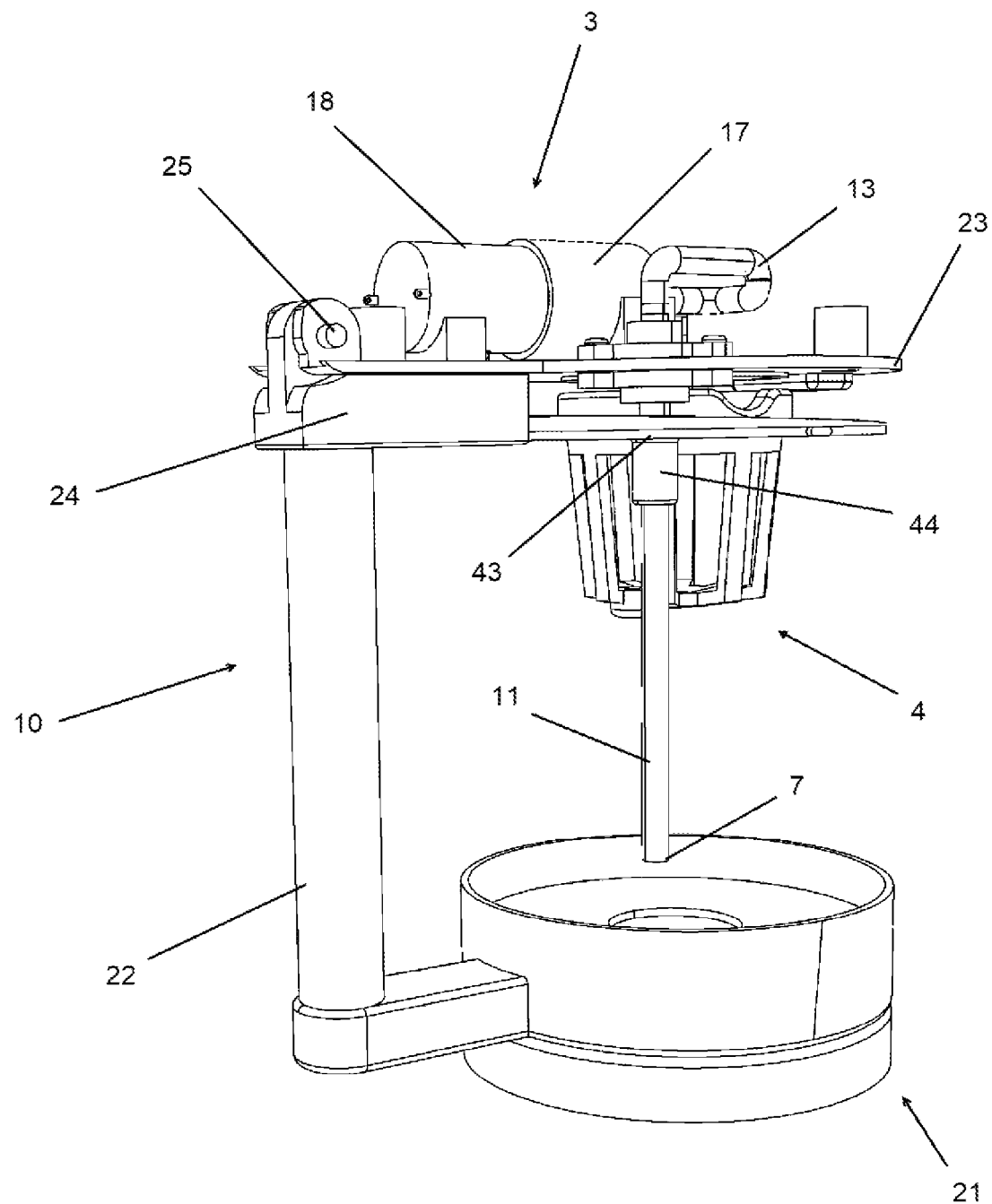
FIG. 3 shows another view of an exemplary embodiment of the beverage brewer of the invention, with the cover and container assembly removed.
Figure 4:
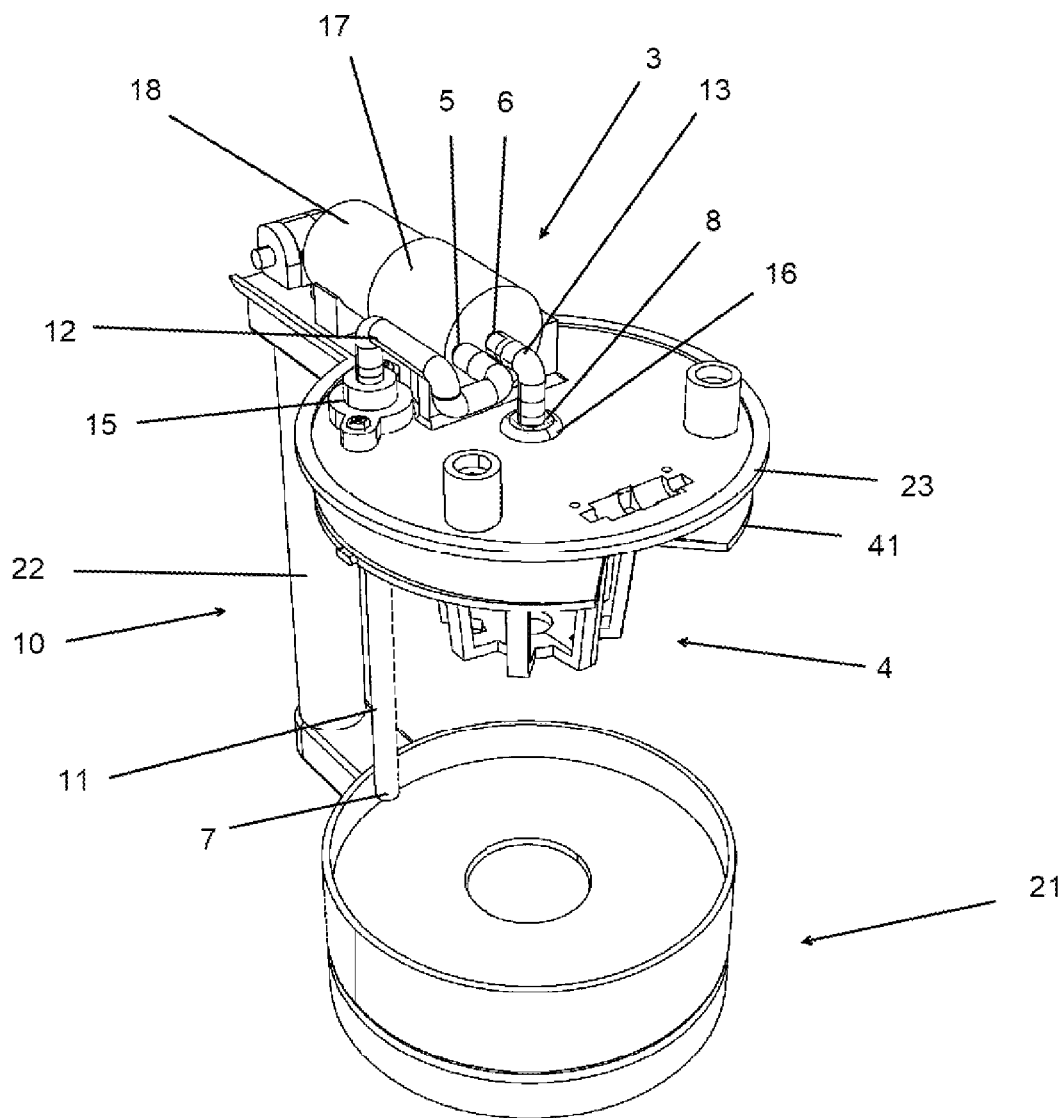
FIG. 4 shows another view of an exemplary embodiment of the beverage brewer of the invention, with the cover and container assembly removed.

With reference to FIGS. 2-4, in order to brew a beverage in this manner, the beverage brewer includes a pump assembly 3 to draw the water from the container and provide the water to a brewing material holder assembly 4, where the brewing material is steeped to brew the beverage. The pump assembly 3 creates negative pressure at an inlet port 5, in a manner known to those of skill in the art, and positive pressure at an outlet port 6, in order to draw fluid at the inlet port 5 and issue the drawn fluid at the outlet port 6.

According to the exemplary embodiment shown, one end 7 of an intake tube assembly is arranged in the container assembly 2 and the other end is connected to the inlet port 5 of the pump assembly 3 so that the pump assembly 3 can draw water from the container assembly 2 to begin the brewing process. Likewise, an outflow tube assembly is connected to an outlet port 6 of the pump assembly at one end, and at the other end 8 is arranged to issue the drawn water into the brewing material holder assembly 4. The brewing material holder assembly 4 is configured to hold ground brewing material, so when the issued water from the outflow tube assembly passes through it, the beverage is brewed. The container assembly 2 is arranged to receive the brewed beverage from the brewing material holder assembly. In this manner, the pump assembly 3 draws fluid from within the container assembly 2 through the intake tube assembly and issues the fluid into the brewing material holder assembly 4 through the outflow tube assembly, to brew the beverage, which is then provided back to the container assembly 2. Thus, water is drawn from the container assembly 2 and replaced with a brewed beverage in the same container assembly 2. Thus, the brewing process requires only one container according to this preferred embodiment.

The beverage brewer 1 can perform this brewing function as a cold-brew operation or as a heated brewing operation. If used to cold-brew a beverage, the cycling of the fluid from the container assembly 2, through the pump assembly 3, through the brewing material holder assembly 4, and back to the container assembly 2 can be repeated as long as needed in order to provide a brewed beverage of the desired strength. To perform a heated brewing operation, the beverage brewer 1 can also include a heating element 9, disposed below the container assembly 2 or otherwise arranged to heat the water in the container assembly 2 before brewing. In this case, the pump assembly 3 can include a timer to delay the pumping action until a predetermined time has passed after activating the heating element 9, so that the water is heated to a suitable temperature before the brewing material is steeped. Alternatively, the water can be circulated as it is heated. Use of the heating element 9 can be bypassed, so that a user can select whether to hot- or cold-brew the beverage. After cold-brewing a beverage, the heating element 9 can be used to warm the cold-brewed beverage, in order to provide a warm beverage with cold-brewed taste.

As shown in FIGS. 2-4, an exemplary embodiment of the beverage brewer includes a frame 10, a holder assembly 4, an intake tube 11, an inlet tube 12, an outlet tube 13, and a pump assembly 3. The intake tube 11 is arranged inside the container assembly 2 and is connected to the frame 10 at a first through-hole 14, which can be supported by a flange 15 on either side to facilitate coupling. The inlet tube 12 is coupled to the frame 10 at the other side of the first through-hole 14, and therefore continues the fluid communication path from the container assembly. The other end of the inlet tube 12 is coupled to the inlet port 5 of the pump assembly 3. Thus, the intake tube assembly is shown in this embodiment to include the intake tube 11 and the inlet tube 12, but a single tube or additional tubes can be used to provide the same effect. For example, a single tube can be pushed through the first through-hole 14 to couple with the pump assembly 3. Alternatively, if the pump assembly 3 is instead mounted on the underside of the frame 10, a through-hole is not necessary and a single tube can be used. In essence, the system provides a fluid path from the interior of the container to the pump and from the pump to the brewing material holder. The pickup tube 11, the inlet tube 12, and the outlet tube 13, or any alternative configurations of tubes, can be coupled so as to be removable for cleaning and/or replacement.

The outlet tube 13 is coupled at one end to the outlet port 6 of the pump assembly 3. The other end of the outlet tube 13 is arranged at a second frame through-hole 8, which can be supported by a flange 16 to facilitate coupling. Again, if the pump assembly 3 is mounted on the other side of the frame 10, a second through-hole might not be necessary. The pump assembly 3 is configured to draw fluid from the container assembly 2 through the intake tube 11 and the inlet tube 12, and to issue the drawn fluid through the outlet tube 13. As configured, the holder assembly 4 can be arranged to receive the issued fluid from the outlet tube 13 in order to brew the beverage.

The pump assembly 3 includes a pump 17, and a motor 18 configured to drive the pump 17, which can be an AC- or DC-driven motor. Power to the pump assembly 3 can be provided via an AC power cord 19 and/or battery to a power converter unit, via a rechargeable battery, via a solar power source, or by any other power source known to those of skill in the art. This power source can also be used to power the heating element 9. As shown, if AC power is provided, a typical AC power cord 19 can extended from the frame 10, which can be used to house any necessary power conversion circuitry and/or power splitter to provide power to the pump assembly 3. Use of a battery source for power would allow the compact brewer 1 to be portable and usable even away from a source of AC power, and therefore both AC and DC power options can be available on the same unit.

Connection of the power to the beverage brewer 1 can be actuated via a power switch accessible to a user, for example, in the form of a button 20. A control unit can be provided to allow the user to control aspects of operation of the brewer 1, such as throughput and duration of the pumping process, and temperature and duration of operation of the heating element. 9

As shown, the frame 10 can include a base 21, an extension 22, and a support chassis 23. The base 21 is configured to be placed on a surface such as a table or kitchen counter and keeps the beverage brewer 1 stable during operation. The extension 22 is coupled to and extends upward from the base 21 at a lower end, and is coupled to the support chassis 23 at an upper end, so as to raise the support chassis 23 above the base 21 a sufficient distance to accommodate the container assembly 2. The pump assembly 3 is preferably coupled to the upper surface of the support chassis 23, as are the upper end of the intake tube 11 and the distal end of the inlet tube 12. The first and second through-holes 14, 8 are arranged in the support chassis to provide fluid communication between the intake tube 11 and inlet tube 12, and the outlet tube 13 and holder assembly 4, respectively. As mentioned above, the components can be alternatively arranged, such as by mounting the pump assembly 3 on the underside of the support chassis 23, or by otherwise arranging the tube components to couple with the pump 17. Cutouts in the periphery of the support chassis 23 can be provided instead of the through-holes. Any arrangement of the pump assembly 3 and the tube components that allows fluid to be drawn from the container assembly 2 and issued to the holder assembly 4 falls within the contemplated scope of the invention.

The extension 22 can be configured at least in part as a handle. The handle can be grasped by a user to move the beverage brewer 1. The extension 22 can be made hollow, so that any wiring coming from the base 21 to the pump assembly 3 or other components on the support chassis 23 can be routed through the handle and will not be exposed.

The support chassis 23 is preferably hingedly coupled to the extension 22, so that the support chassis 23 and attached components can be lifted away from the container assembly 2 while remaining coupled to the extension 22. The beverage brewer 1 can also include a support collar 24, coupled to an upper end of the extension 22 and configured to support the support chassis 23 when the support chassis 23 is in the lowered position. The support collar 24 also provides a stop position when lowering the support chassis 23. The support chassis 23 and the support collar 24 can be coupled to the extension 22 at the same hinge connection 25. In order to allow for movement of the support chassis 23, the intake tube 11 can be made from a flexible material, can be formed into a bowed or otherwise non-linear shape, or can include a flex section by corrugated folding of the sidewall of the intake tube 11. Generally, the intake tube 11 can be but need not be straight and rigid, and any modification of the material, shape, and composition of the intake tube 11 apparent to those of skill in the art is contemplated as included within the scope of the invention, so long as the intake tube 11 provides fluid communication from end-to-end. For example, the intake tube can have a rubber tip, or a filter at the container end to filter out particulate matter that might be present during recirculation.

Figure 5:
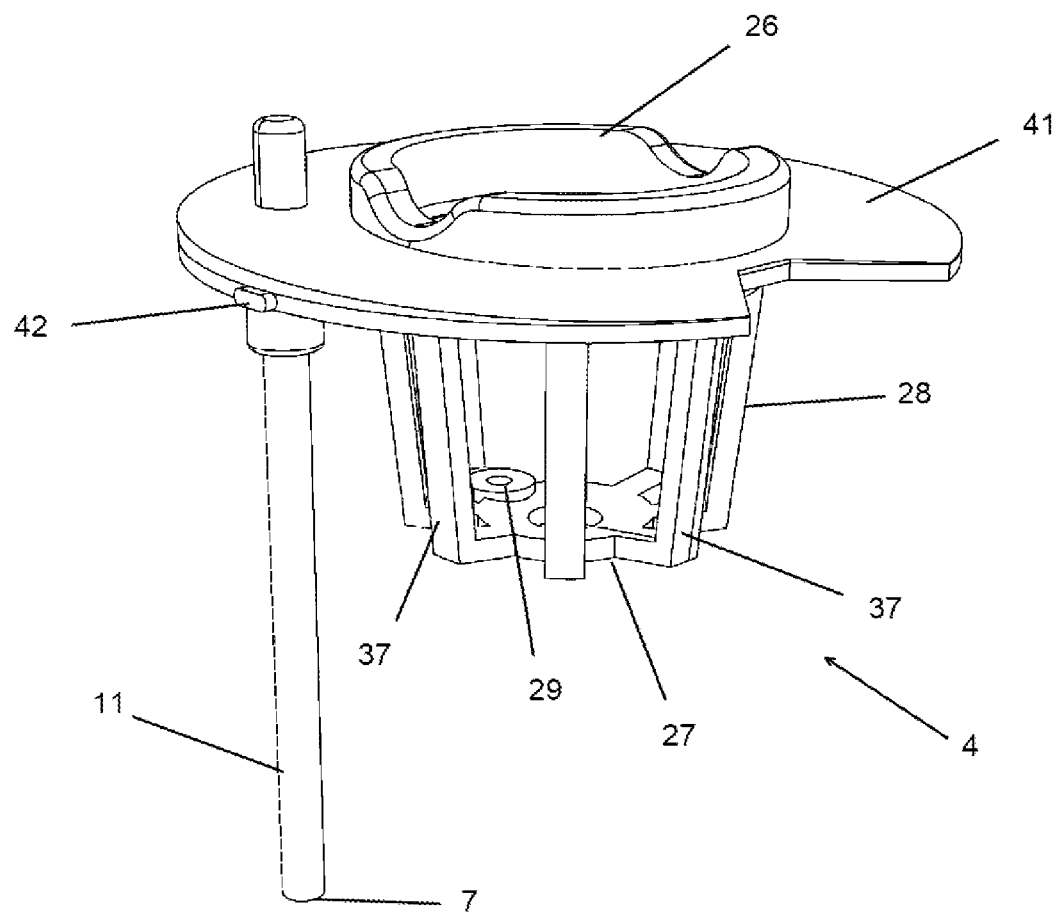
FIG. 5 shows a view of an exemplary embodiment of a holder assembly of the beverage brewer of the invention.
Figure 6:
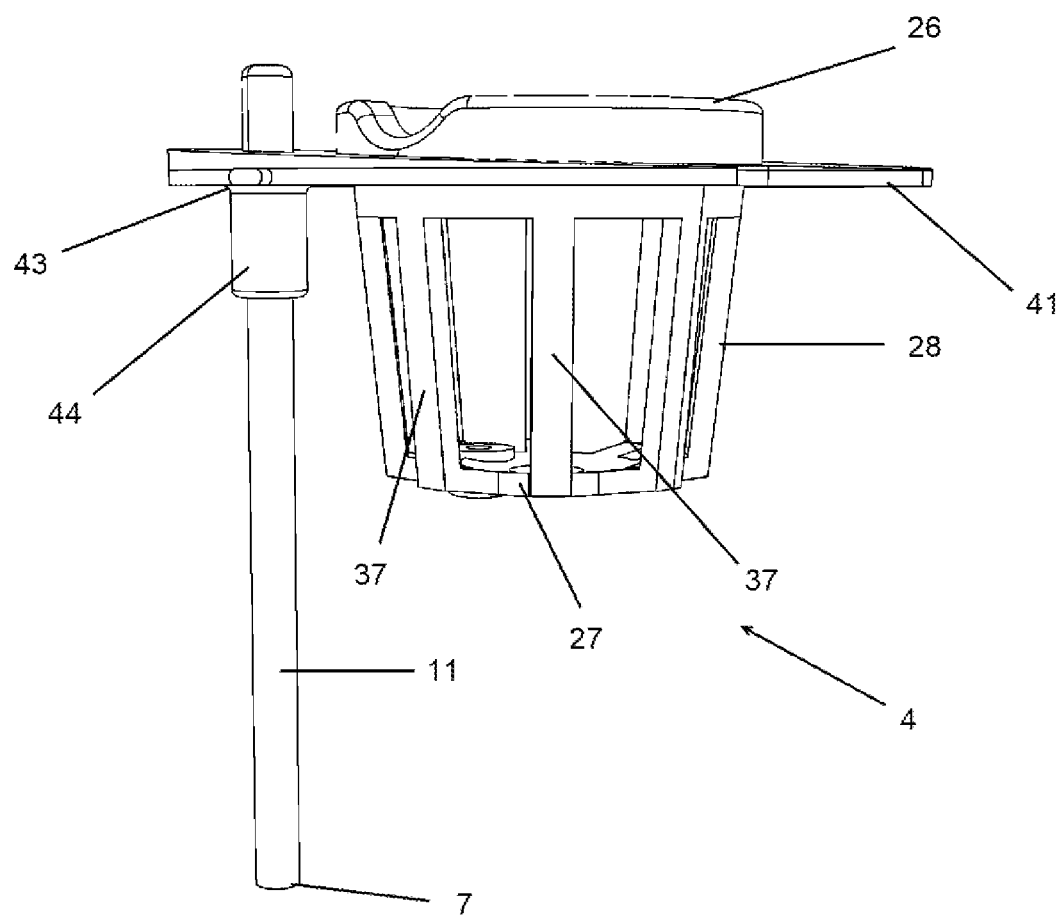
FIG. 6 shows another view of an exemplary embodiment of a holder assembly of the beverage brewer of the invention.
Figure 7:
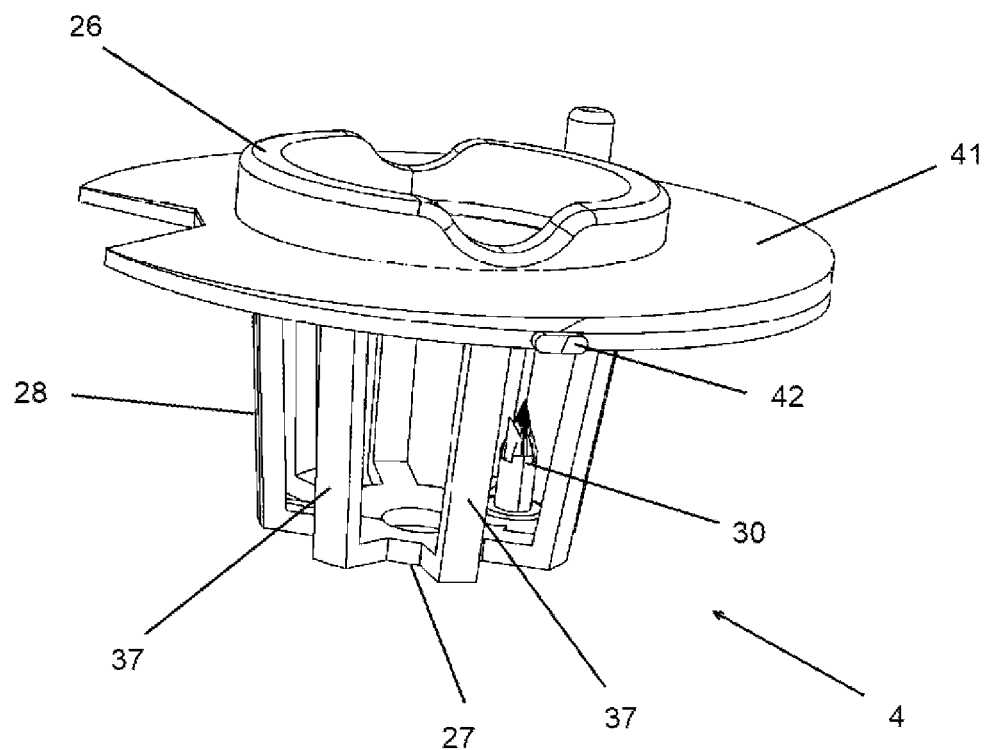
FIG. 7 shows another view of an exemplary embodiment of a holder assembly of the beverage brewer of the invention.

The holder assembly 4 is configured to hold brewing material, either directly or by holding a container that stores the brewing material. The holder assembly can be embodied by a structure as simple as a ring configured to support a beverage capsule by an upper rim, or can include additional elements for flexibility of use. It is contemplated that the holder assembly 4 can be configured to hold any one or more of a disposable beverage capsule, a reusable beverage capsule, and filter material, or can be configured to hold the beverage material directly. As shown in FIGS. 5-7, an exemplary holder assembly 4 includes at least an upper holder rim 26, a holder bottom 27, and a holder sidewall 28 connecting the upper holder rim 26 to the holder bottom 27. The holder bottom 27 preferably has an aperture 29, arranged anywhere in the bottom, such as in a central location or, as shown, offset from the center, and preferably supported by a flange. Depending on the intended use of the holder assembly 4, the particular configuration of the sidewall and bottom can vary, as described in more detail below.

Figure 8:
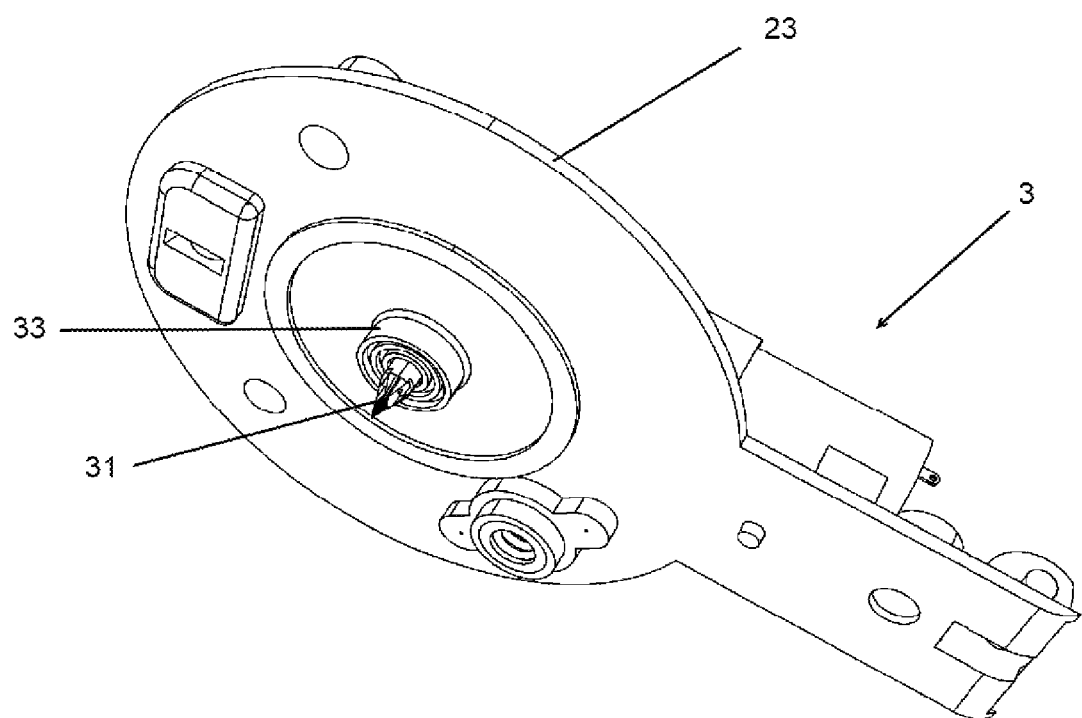
FIG. 8 shows the underside of the support chassis of an exemplary embodiment of the invention.

For example, the holder assembly 4 can be configured to be used with pre-packaged, sealed brewed beverage capsules. Such pre-packaged capsules are the type used, for example, in Keurig®-style beverage machines and commonly known as K-Cups® or K-Cup® pods, although any similar pre-packaged capsules, disposable or otherwise, are contemplated for use with the holder assembly 4 of the invention. In this case, the beverage brewer 1 can also include a bottom needle 30 (FIG. 7) coupled within the holder bottom aperture 29 and extending into an interior of the holder assembly 4, and an upper needle 31 (FIG. 8) coupled within the second frame through-hole 8 and extending toward the base 21, that is in this case, downward, so that it extends toward the interior of the holder assembly 4 when the holder assembly 4 is arranged for brewing. Thus, the distal end of the outlet tube 13 is arranged for fluid communication with the upper needle 31 through the second frame through-hole 8, A flange or seal 33 that provides air-tight of the upper needle 31 with the chassis support 23 at the second frame through-hole 8 can be provided to prevent leaks at the fluid connection between the outlet tube 13 and the upper needle 31.

The bottom and upper needles 30, 31 are, for example, open tubes having sharp ends directed toward the inside of the holder assembly 4. The needles can be, for example, tubes having circular cross-sections, with an end cut at an oblique angle so as to form a pointed end. The needles can be formed, for example, of hard plastic or metal. Alternatively, the needles can be formed of multiple components, such as a plastic tube fitted with a metal tip that is crimped, friction-fitted, or otherwise attached to the plastic tube. Any needle configuration of a tube having an end configured to pierce a sealed brewed beverage capsule is contemplated for use as the needles of the present invention.

Figure 9:
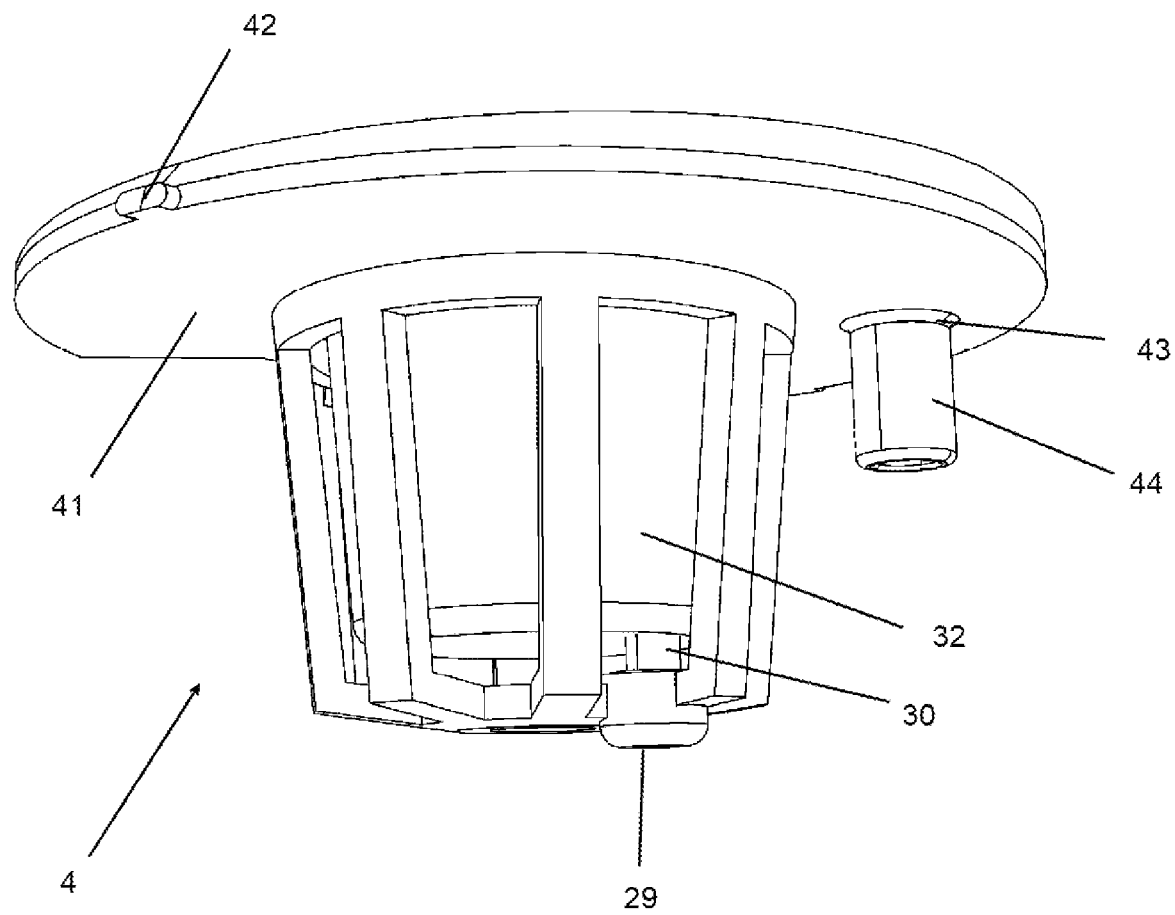
FIG. 9 shows a view of an exemplary embodiment of a holder assembly of the beverage brewer of the invention, in which a sealed container of ground brewing material is inserted.
Figure 10:
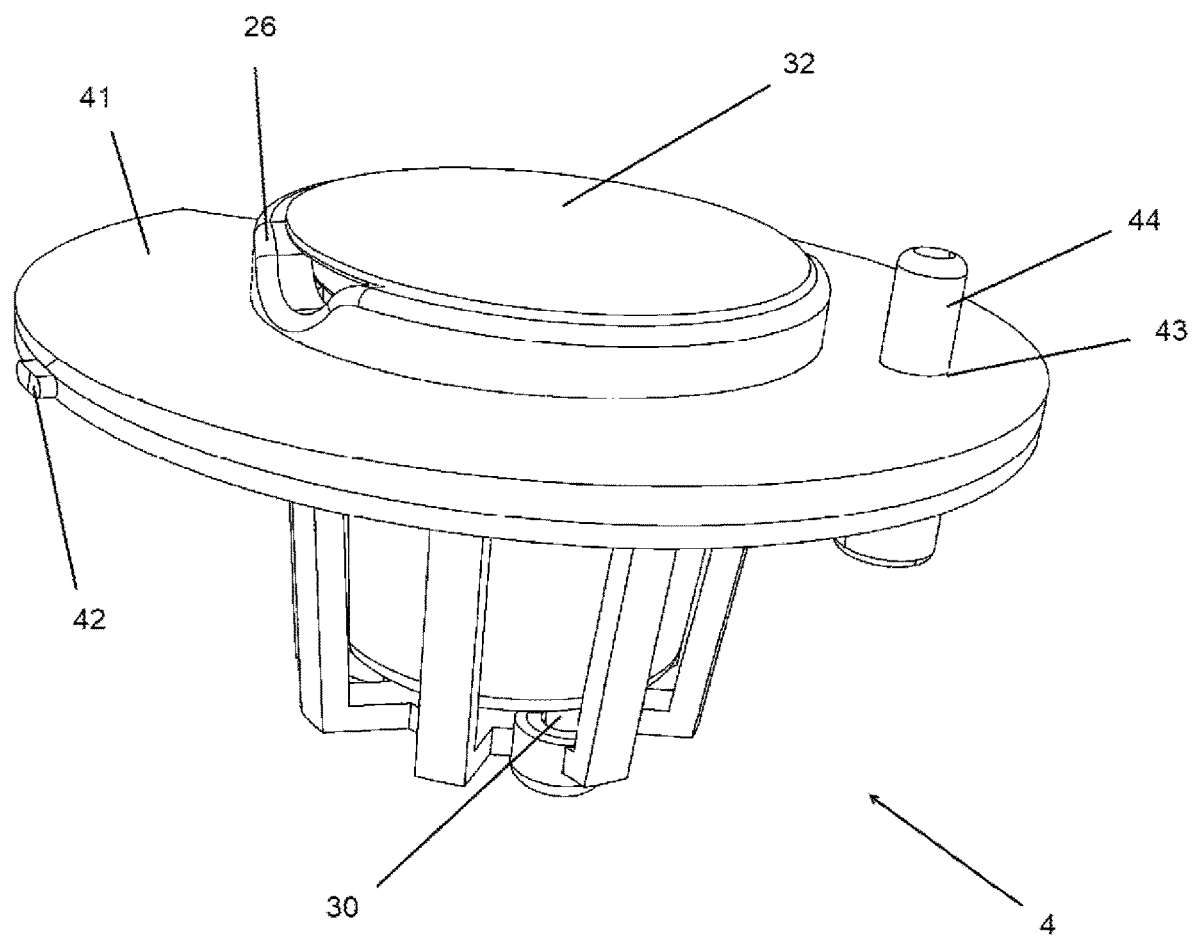
FIG. 10 shows another view of an exemplary embodiment of a holder assembly of the beverage brewer of the invention, in which a sealed container of ground brewing material is inserted.

With reference to FIGS. 9 and 10, according to this exemplary embodiment, a sealed container or capsule of ground brewing material 32 is placed inside the holder assembly 4 and can be pushed down into the holder assembly 4 such that the bottom needle 30 pierces the bottom of the sealed container 32, providing the tube of the bottom needle fluid access to the inside of the sealed container 32. Typically, the sealed container 32 will have an upper rim, which can rest on the upper holder rim 26 when fully inserted into the holder assembly 4. When the support chassis 23 is brought down into a closed position, the upper needle 31 pierces the upper surface of the sealed container 32 of ground brewing material. The flange or seal 33 can butt against the upper surface as well, to provide a seal with the container and provide a stopping point for the upper needle 31. When water is provided to the outlet tube 13 by the pump assembly 3, the water flows from the outlet tube 13 into the tube of the upper needle 31 and therefore into the interior of the sealed container 32, where it steeps the ground beverage material in the container 32 and brews the beverage. The brewed beverage then flows outward from the container 32 via the bottom needle 30, and into the container assembly 2 below. Because the fluid flow passes through the sealed container 32 from the upper needle 31 to the bottom needle 30, the holder assembly sidewall 28 can be, but need not be, a solid surface, or can include openings. Thus, the beverage is brewed under pressure from the pump assembly 3, using liquid taken from the same container 2 in which the beverage is ultimately delivered.

Figure 11:
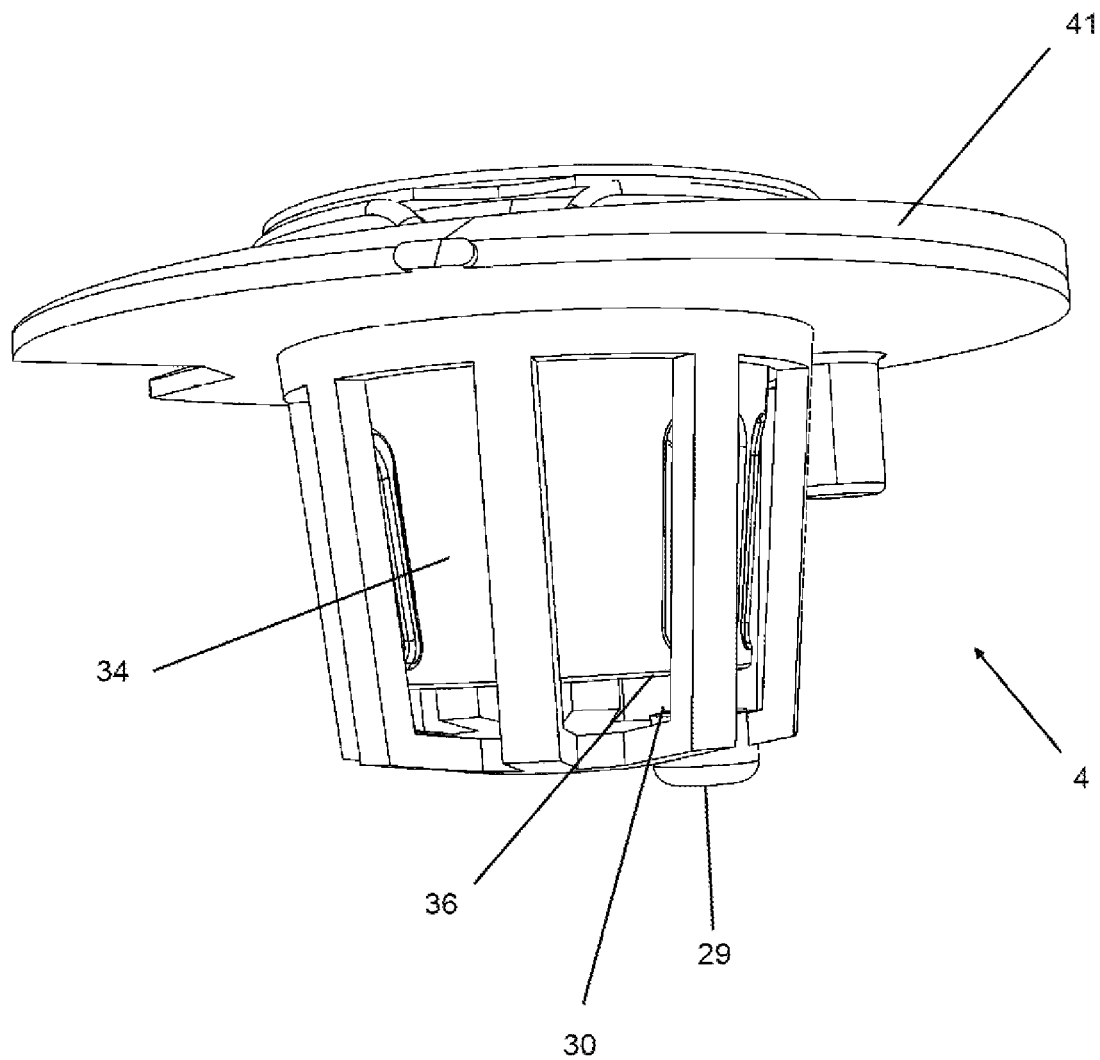
FIG. 11 shows a view of an exemplary embodiment of a holder assembly of the beverage brewer of the invention, in which a reusable container of ground brewing material is inserted.
Figure 12:
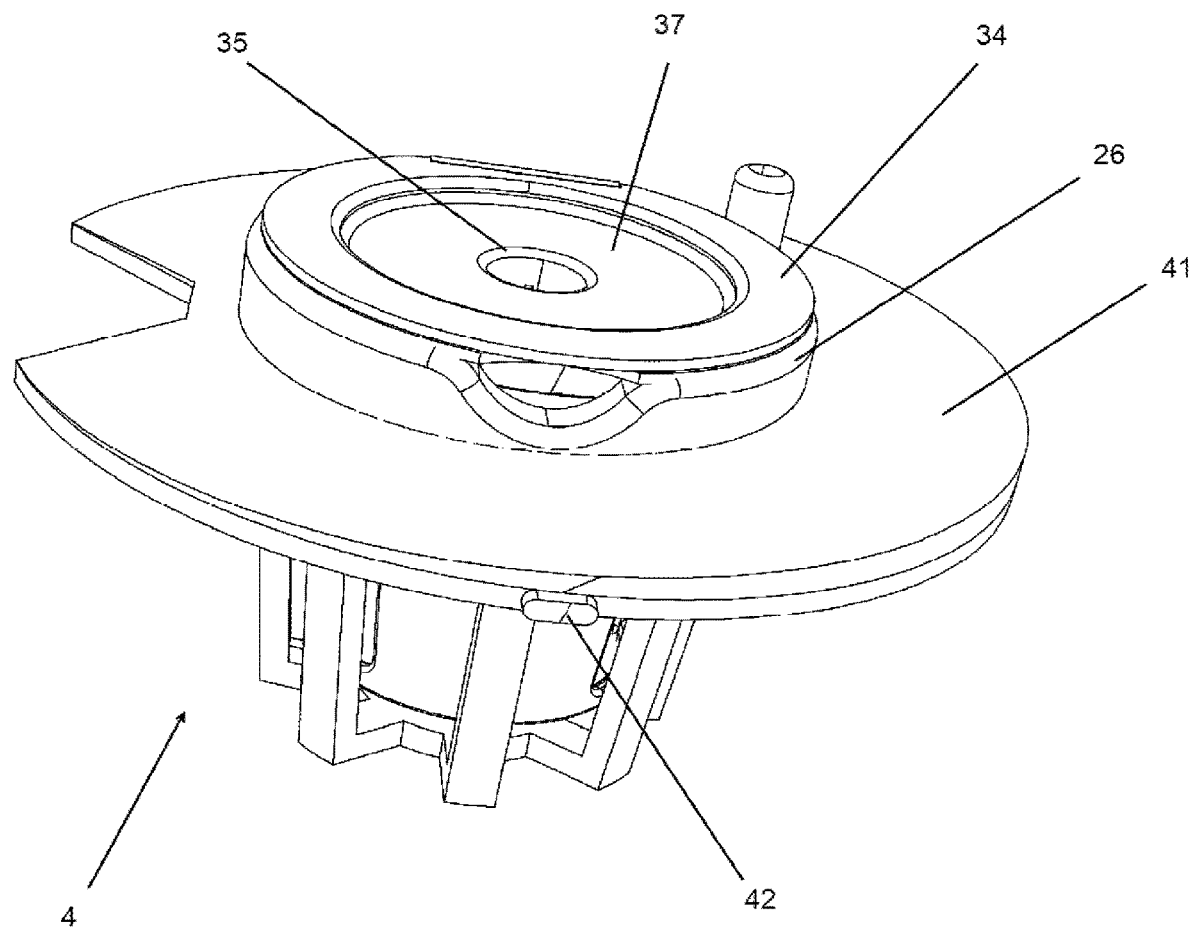
FIG. 12 shows another view of an exemplary embodiment of a holder assembly of the beverage brewer of the invention, in which a reusable container of ground brewing material is inserted.

Alternatively, or in addition, the holder assembly 4 can be configured to be used with reusable beverage brewing capsules, such as the EcoFill® brewing container, as shown in FIGS. 11 and 12. These containers typically include an upper container rim, a container bottom having a container bottom aperture, a container sidewall connecting the upper rim to the bottom, and a lid configured to be removably coupled to the upper container rim and having a lid aperture. Alternatively, the sidewall and/or bottom have open panels covered by a mesh material. The container can hold beverage brewing material to be brewed, and can be emptied and cleaned afterward for re-use. Thus, the holder assembly 4 can be configured to receive such a reusable container 34 containing ground brewing material. In this case, the beverage brewer 1 can include a bottom tube 30 coupled within the holder bottom aperture 29 and extending into an interior of the holder assembly 4, and an upper tube 31 coupled within the second frame through-hole 8 and extending toward the base 21. Thus, the distal end of the outlet tube 13 is arranged for fluid communication with the upper tube 31 through the second frame through-hole 8. The upper and bottom tubes 31, 30 can be needles, such as those described for use in the previous embodiment, but need not be as no surface would require piercing. Alternatively, if the reusable container 34 does not include a lid, the upper tube can have an end having any size and geometric shape, such as a round shower-style head providing a distribution of a number of apertures through which the liquid can be dispersed over the brewing material in the reusable container 34, and this tube end can be stationary or can rotate or otherwise move above the container.

The upper tube 31 enters the interior of the reusable container 34 through the lid aperture 35, and provides fluid from the pump assembly 3 to the interior of the reusable container 34 where it steeps the beverage brewing material, thereby brewing the beverage. The flange or seal 33 butts against the container lid 37 and covers the lid aperture 35, to prevent leakage or spilling. The bottom tube 30 enters the interior of the reusable container 34 through the container bottom aperture 36, and issues the brewed beverage to the container assembly 2 below. If the re-usable container 34 has mesh sidewall and/or bottom panels, a bottom tube 30 is not necessary as brewed beverage can flow from the re-usable container 34 through the mesh panels and into the holder assembly 4, and out through the holder bottom aperture 29 and into the container assembly 2 below.

Alternatively, or in addition, the holder assembly 4 can itself be configured to hold ground brewing material and brew the beverage. For example, the upper tube 31 can be configured to enter an interior of the holder assembly 4 upper holder rim 26 when the holder assembly 4 is arranged to receive the issued fluid from the outlet tube 13, and to provide the issued fluid to the interior of the holder assembly 14, thereby brewing a beverage. The bottom tube 30 can be configured to enter the interior of the holder assembly 4 through the holder bottom aperture 29 when the holder assembly 4 is arranged to receive the issued fluid from the outlet tube 13, and to issue the brewed beverage to the container assembly 2 below.

Figure 23:
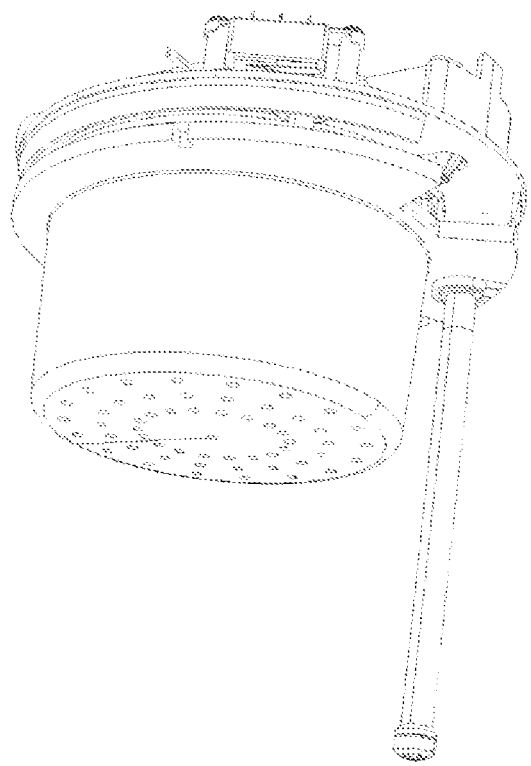
FIG. 23 shows an exemplary filter basket according to the invention.
Figure 24:
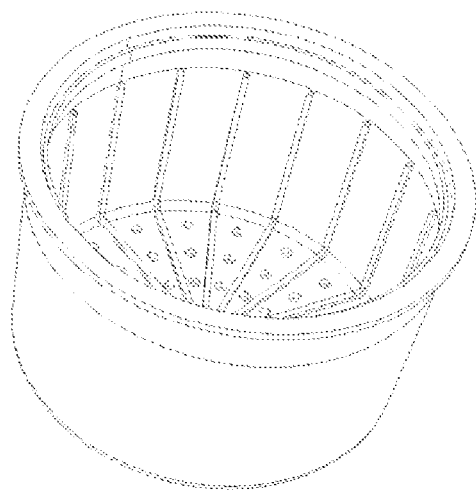
FIG. 24 shows an interior of an exemplary filter basket according to the invention.

As shown in FIG. 23, the holder assembly can include a simple filter basket, which is perforated, preferably in the bottom surface to allow flow of brewed beverage from the basket. As shown in FIG. 24, the interior of the basket can be ribbed to prevent any container of brewing material used with the basket from coming into direct contact with the bottom and/or sides of the basket.

As mentioned above, if the holder assembly 4 does not include a lid, the upper tube can have an end having any size and geometric shape, such as a round shower-style head providing a distribution of a number of apertures through which the liquid can be dispersed over the brewing material in the holder assembly 4, and this tube end can be stationary or can rotate or otherwise move above the container.

Alternatively, the bottom tube 30 need not be used, and the brewed beverage can flow from the holder assembly 4 through the holder bottom aperture 29 to the container assembly 2 below. In this case, if a pre-packaged or reusable beverage brewing container is not available, a beverage can still be brewed using the beverage brewer 1 of the invention. In this case, in order not to get beverage brewing material such as coffee grounds in the container assembly 2, it is preferable to insert a disposable paper or reusable wire mesh filter or the like into the holder assembly 4 to support the beverage brewing material.

The holder assembly 4 can be modified to issue the brewed beverage in an alternative manner. For example, the beverage brewer 1 can include an upper tube 31 coupled within the second frame through-hole 8 and extending toward the base 21. The distal end of the outlet tube 13 can be arranged for fluid communication with the upper tube 31 through the second frame through-hole 8. The holder sidewall 28 can include a number of ribs 37 connected at opposite ends between the upper holder rim 26 and the holder bottom 27. The ribs 37 and corresponding spaces between the ribs 37 define the holder sidewall 28. The holder assembly 4 in this case includes mesh material at least partially covering the spaces between the ribs 37 in the holder sidewall 28. The holder assembly 4 can then hold ground brewing material, and the upper tube 31 can enter the interior of the upper holder rim 26 when the holder assembly 4 is arranged below the outlet tube 13, and to provide water from the pump assembly 3 to the interior of the holder assembly 4, thereby brewing a beverage. The mesh material allows the brewed beverage to flow outward from the holder assembly 4 and into the container assembly 2 below. The holder bottom 27 can include open areas corresponding to the spaces between the ribs 37 in the holder sidewall 28, and the mesh material can at least partially cover the open areas. With this embodiment, a beverage can be brewed without the use of a pre-packaged or reusable beverage brewing container, and without using a filter within the holder assembly 4.

It should be apparent to those of skill in the art that an embodiment in which the holder sidewall 28 includes ribs 37 and meshed sections, the upper tube 31 is an upper needle, and the bottom tube 30 is a bottom needle, is a versatile embodiment that allows a beverage to be brewed from beverage material enclosed within a pre-packaged and sealed container, from beverage material enclosed within a reusable container, or from beverage material supported within the holder assembly directly, and any particular structural embodiment that enables any or all of these brewing scenarios is contemplated for use according to the invention.

The holder assembly 4 is described as a separate element, but can be attached to, coupled to, or integrated with other elements of the brewer, for ease or economy of production, stability, or any other reason. For example, at least a portion of the intake tube assembly can be removably coupled to the brewing material holder assembly, or can be attached to any portion of the holder assembly, or can be manufactured integrally with the holder assembly.

The container assembly 2 is configured to receive and hold fluid and to be arranged on the base 21 such that the suction end 7 of the intake tube 11 is disposed within an interior of the container assembly 2. Preferably, the intake tube suction end 7 hangs down low enough within the container assembly 2 to draw liquid from within the container assembly 2 when the pump assembly 3 is in operation even when brewing a small amount of beverage, that is, when providing a small amount of liquid in the container assembly, as the approximate arrangement of the pickup tube suction end 7 will roughly determine the minimum amount of beverage that can be brewed.

As shown, the container assembly 2 includes a container body 38 and a container collar 39. The container body 38 is a typical vessel for holding a liquid, and includes an open upper container rim, a container bottom, and a container sidewall connecting the upper container rim to the container bottom. The container collar 39 fits over the top of the container body 38, and includes an open upper collar rim, an open bottom collar rim, and a collar sidewall connecting the upper collar rim to the bottom collar rim. The bottom collar rim corresponds to and is coupled to the upper container rim. Preferably, the upper collar rim includes a spout 40 to facilitate pouring the brewed beverage from the container assembly 2.

The holder assembly 4 preferably is mountable within the container collar 39, and includes a holder plate 41 extending outward from the holder sidewall 28. As shown, the holder plate 41 preferably extends outward from the holder sidewall 28 at a distance downward from the upper holder rim 26, which preferably includes indentations to facilitate removal of a pre-packaged or reusable beverage material container from the holder assembly 4. The holder plate 41 is configured to couple with an inside surface of the container collar 39 such that the holder assembly 4 is arranged within the collar sidewall.

For example, the peripheral edge of the holder plate 41 can include nubs 42 that snap-fit into corresponding indentations in the inside sidewall of the container collar 39. Other snap-fit, friction-fit, screw-in, or other type of configuration can be provided such that the holder assembly 4 is easily removably couplable to the container collar 39, as known to those of skill in the art. Although it is preferable for the holder assembly 4 to be coupled to the container collar 39 while brewing a beverage, the holder plate 41 can instead or in addition be configured to couple with the underside of the support chassis 23, through the use of snap-in elements or the like. The holder plate 41 can include a plate through-hole 43, preferably supported by one or more flanges 44, such that the proximal end of the intake tube 11 can be coupled to the holder plate 41 at the plate through-hole 43.

The intake tube is described as being coupled to the holder plate at a through-hole. However, many alternative arrangements are contemplated within the intended scope of the invention. For example, the intake tube can be pushed through the through-hole to extend in either direction from the holder plate. The intake tube can be coupled through the support chassis, coupled to the cover, attached directly to the sidewall of the holder, or otherwise arranged to provide the intake function required for brewing a beverage using water originally held in the eventual serving vessel. In order to effectuate these alternative arrangements, the intake tube need not be straight, but can assume any shape, such as a bowed shape, a twisted arrangement, or any other shape, and can include a fold, spring section, or any other arrangement to provide any needed resiliency.

Further, the intake tube can be routed through the extension/handle, and the pump assembly can be arranged on or in the extension/handle. Alternatively, the container body can have a hollow handle in which the intake tube is arranged, or which functions as the suction end of the intake tube, providing access to the interior of the container body for drawing liquid to be recirculated for brewing.

For example, the suction end of the intake tube assembly can be arranged in any way that allows for fluid communication with an interior of the container volume, and at least a portion of the intake tube assembly can be attached to the container assembly, for example, to an inside surface of the container assembly.

Alternatively, a portion of the intake tube assembly can be coupled to the container assembly outside of the container volume. In this case, the container assembly can include a port allowing fluid communication between the interior of the container assembly and outside the container assembly. The suction end of the intake tube assembly can be arranged at the container assembly port, a portion of the intake tube assembly can be coupled to an outside surface of the container assembly, and the pump assembly can be coupled to the outside surface of the container assembly. Thus, the intake tube assembly can draw fluid from the inside of the container assembly through the port and to the externally arranged pump assembly, which provides the fluid to the outflow tube assembly. The port itself can be the suction end of the intake tube assembly, or a length of tube can be coupled or attached at the port within the container assembly to provide extra reach for the suction end, if desired.

Such an external arrangement for the intake tube assembly can be convenient when arranged in cooperation with other container assembly elements. For example, the container assembly can include a handle, which can include a hollow internal channel forming a portion of the intake tube assembly and/or the outflow tube assembly. Alternatively, the handle can include a hollow internal channel in which at least a portion of the intake tube assembly is arranged. The pump assembly can be arranged in the handle. Thus, a handle used for convenience in dispensing the resulting brewed beverage can be arranged as a functional aspect of the beverage brewer.

Any arrangement of the tube and pump assemblies that enables brewing liquid to be recirculated from the container body, through the holder assembly, and back into the container body, is contemplated as being included within the scope of the invention.

Figure 13:
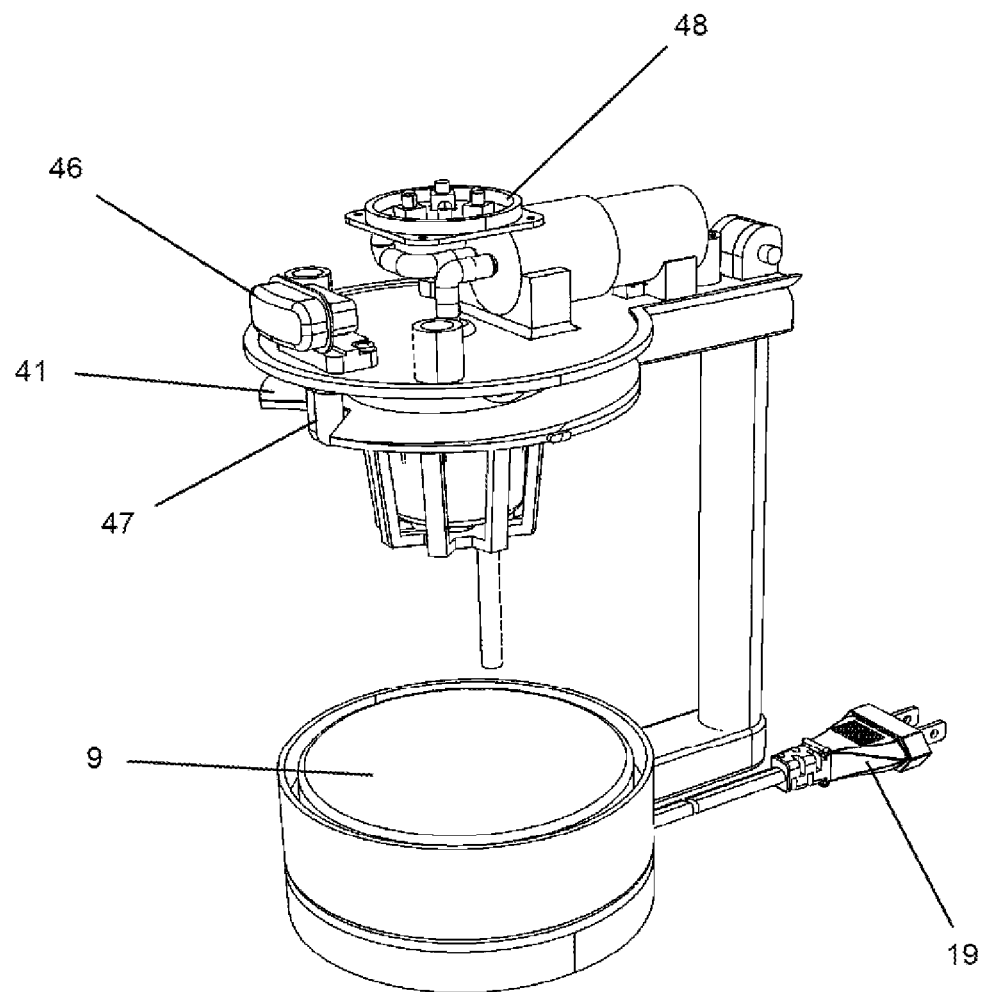
FIG. 13 shows an exemplary embodiment of the beverage brewer of the invention with the cover removed.

As mentioned above, the beverage brewer 1 can also include a heating element 9 disposed on or in the base 21. See FIG. 13. Without the heating element 9, the beverage brewer 1 can be used to cold-brew a beverage. With the heating element 9, the beverage brewer 1 provides versatility in that a beverage can be brewed with hot water. In this case, the heating element 9 should be actuated for a sufficient period of time to heat the water in the container assembly 2 to an adequate temperature before the pump assembly 3 begins to circulate the water through the holder assembly 4, or the water can be heated as the water circulates. A timer can be provided to delay the pumping action once the brewer 1 has been actuated, or the intake tube 11 can incorporate a thermometer that provides an output to a controller that actuates the pump assembly 3 only after a threshold temperature has been reached.

Once the beverage has been brewed, the temperature of the heating element 9 can be reduced, in order to keep the brewed beverage in the container assembly 2 at a desired serving temperature. Alternatively, a beverage can be cold-brewed and once brewing is finished, the heating element 9 can raise the temperature of the brewed beverage to a desired warm serving temperature. The heating element can be arranged in multiple zones to provide separate brewing and warming functions, and the heating element can include an extension that measures the temperature of the water/beverage to make automatic adjustments to the temperature, as controlled by the controller.

Figure 14:
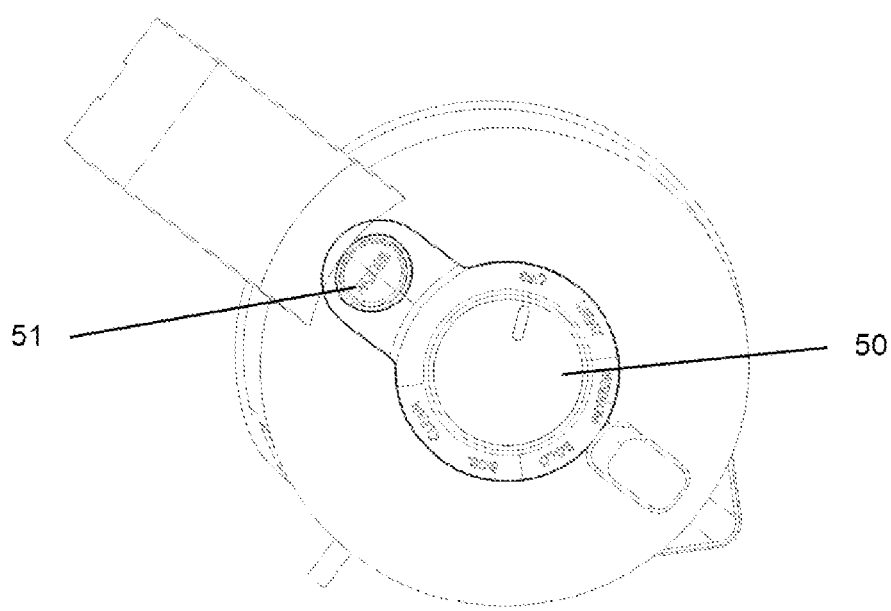
FIG. 14 shows a top view of an exemplary brewer according to the invention, with a control option interface enabling brew strength selection and additional modes, as well as an on/off actuation button.

FIG. 14 shows a top view of an exemplary brewer according to the invention, with a control option interface 50, configured in communication with the controller, enabling brew strength selection and additional modes, as well as an on/off actuation button 51. In this exemplary embodiment, a user selects the strength of brew desired for the brewed beverage. A stronger brew requires a longer brew time, and therefore selection of the bold brew option will result in a longer brew time, that is, a longer time during which the brew liquid will recycle through the system, passing through the holder assembly 4, As the liquid recirculates, the resulting brewed beverage gets bolder, that is, stronger. Conversely, a lighter brew requires less recirculation and therefore a shorter brew time. Although available brew strengths are shown as discrete options, different brew strengths can be made available across a continuous spectrum, allowing for a truly custom brew strength, by providing varying brew times across a continuous scale.

The strength of the resulting brew also depends on the amount of water in the container body. That is, the volume of water added to the container body is the same as the amount of resulting brewed beverage that will be produced. Larger volumes of water will require longer brew times to brew a beverage having a strength comparable to that of a beverage brewed from a smaller volume of water. Thus, a volume input can also be provided to the controller, providing a volume value that is taken into account when determining and setting the brew time for a desired brewed beverage strength. The volume value corresponds to the volume of water in the container body, and can be set in any of a number of ways. For example, the value can be set by the user using the control option interface, based on the amount of water the user adds to the container body. Alternatively, the volume of the water in the container body can be determined by the beverage brewer, using a float with a sensor, a weight scale in the base 21, or any means of providing an accurate volume value to the controller.

As shown, a mode can be provided in which liquid in the container is boiled without circulation through the system, or is heated to a desired drinking temperature, and a cleaning mode is provided in which heated cleaning liquid or plain water is circulated through the system to flush the system components.

Thus, the beverage brewer can include a control assembly configured to selectively actuate the pump assembly. The control assembly can function automatically as pre-programmed, and/or can include a user interface configured to accept brew parameters provided by a user. For example, the user interface can be configured to accept a brew parameter associated with desired brew strength. To this end, the control assembly can selectively control a duration of pump assembly actuation and/or a pump assembly flow rate, either automatically or according to an input provided by the user. The beverage brewer can also include a volume detector configured to determine a volume of liquid present within the container assembly, either as one of the brew parameters provided by the user via the user interface, or by automatic means. The control assembly can use the determined volume of liquid as a basis for selectively controlling the duration of pump assembly actuation and/or the pump assembly flow rate. For heated brewing, the control assembly can be configured to selectively control a duration of heating element actuation and/or a heating element temperature as well. Any and all of these factors can be used by the control assembly to provide the beverage brew strength desired by the user.

Figure 15:
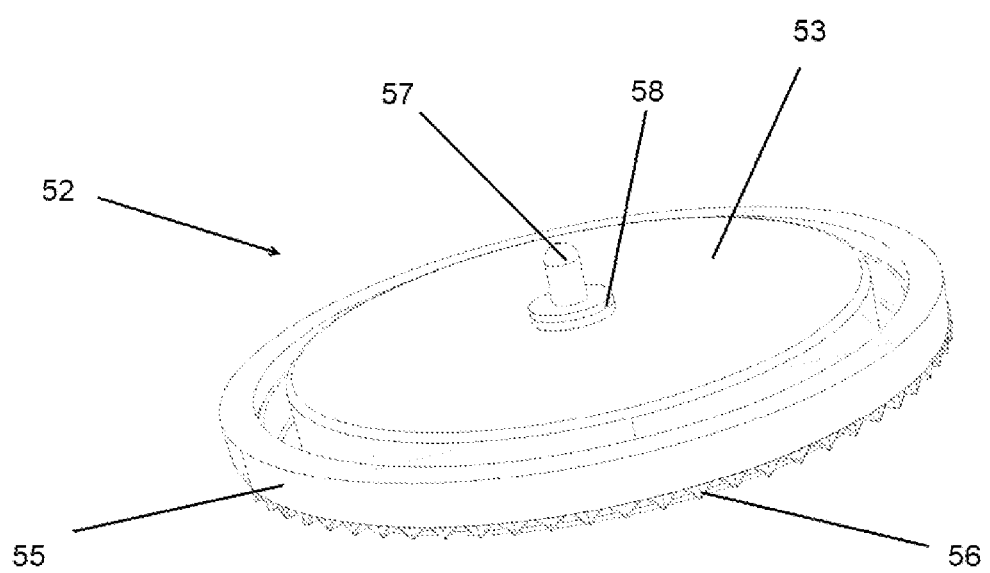
FIG. 15 shows an exemplary heating element assembly according to the invention.
Figure 16:
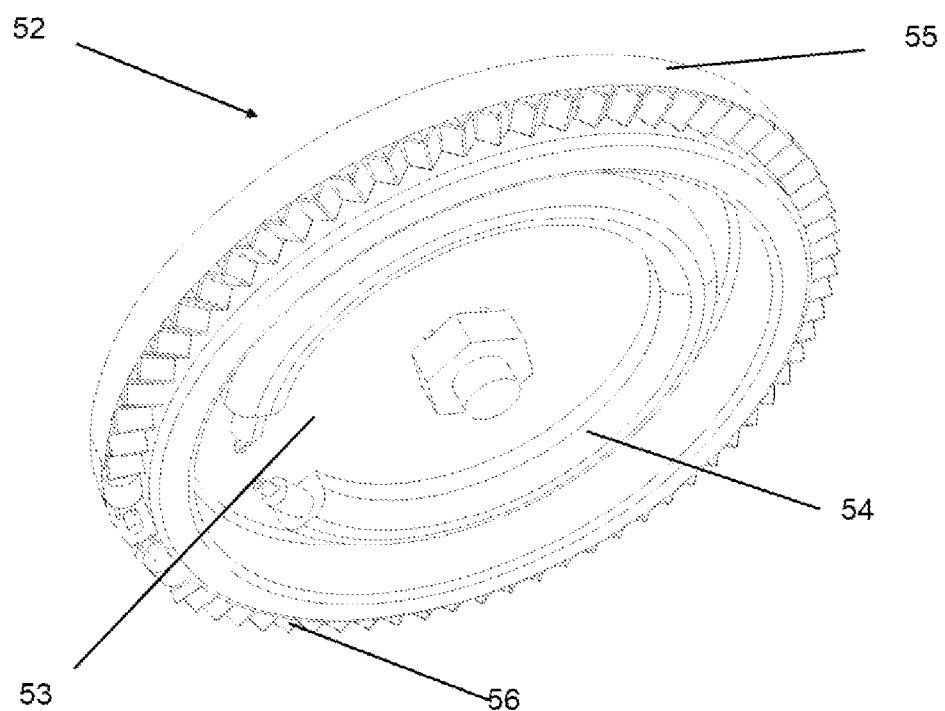
FIG. 16 shows an underside of an exemplary heating element assembly according to the invention.

FIGS. 15 and 16 show an exemplary heating element assembly 52 according to the invention. As shown, the heating element assembly 52 includes a heat plate 53 preferably made from a material that is suitable for absorbing and transmitting heat from the heating element 54, which is connected to electrical power provided to the brewer. For example, the heat plate 53 can be a stainless steel plate. Optionally, an illumination ring 55 can be arranged around the periphery of the heat plate 53. The ring 55 can include lighting elements 56 such as LED light spikes that illuminate when the brewer is in use. It is contemplated that, in hot brew mode, the lighting elements 56 can change color as brew time advances or as the sensed temperature increases. The ring 55 can be powered by electrical connection to the power supply assembly. The temperature probe 57 can be arranged at a through-hole in the plate 53, and can either be arranged in contact with the plate 53 to register the heat of the plate 53, or can be thermally isolated from the plate 53 by a probe seal 58 to enable measurement of the temperature at the container 2.

Figure 17:
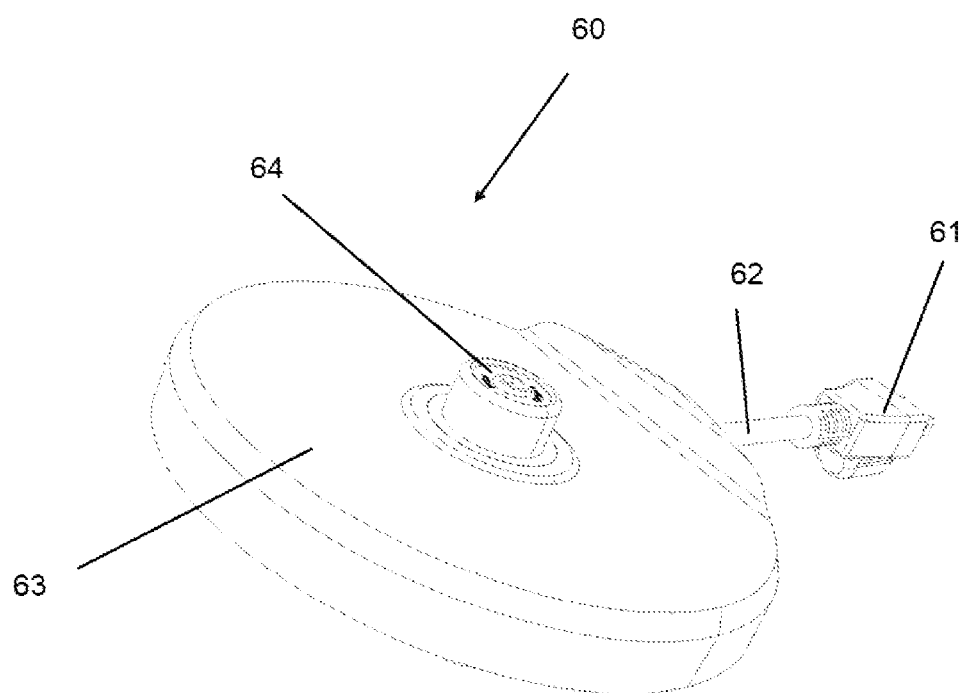
FIG. 17 shows an exemplary embodiment of the power base for the brewer according to the invention.

FIG. 17 shows an exemplary embodiment of the power base 60 for the brewer according to the invention. As shown, in this embodiment AC power is provided via a plug 61 and wire 62 coming into the power base chassis 63. In the chassis 63, power is directed to the power connector 64, which extends upward from the chassis 63. The power connector 64 provides convenient access to power for the heating element assembly 52 and temperature probe 57.

Figure 18:
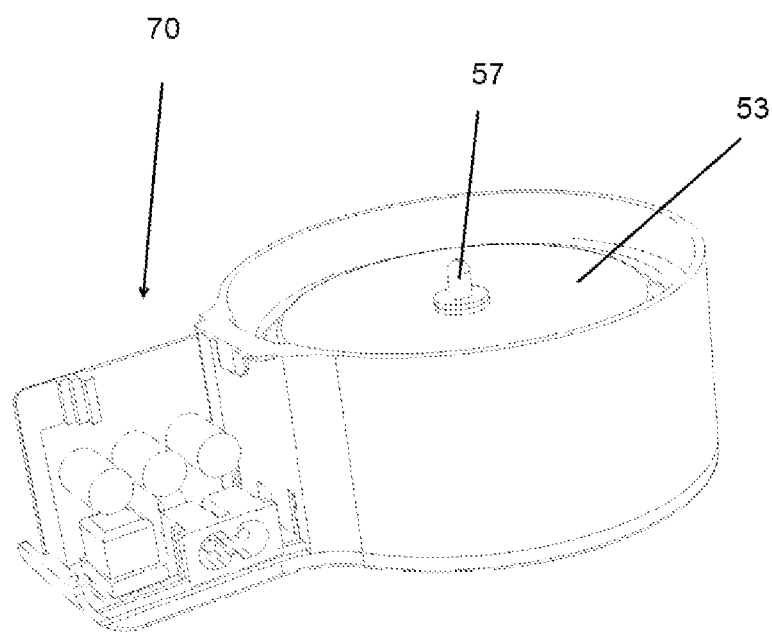
FIG. 18 shows an exemplary power supply assembly for the beverage brewer of the invention, housed in this case in the bottom of the handle assembly.

FIG. 18 shows an exemplary power supply assembly 70 for the beverage brewer of the invention, housed in this case in the bottom of the handle assembly. Locating the power supply assembly 70 in the base at the bottom of the handle is convenient for access to the power cord, and to the heating assembly elements that require power. In addition, it is convenient to run power through the interior of the handle to control circuitry that might be arranged on the support chassis 23. However, any arrangement apparent to those of skill in the art can be used advantageously according to the invention.

Figure 19:
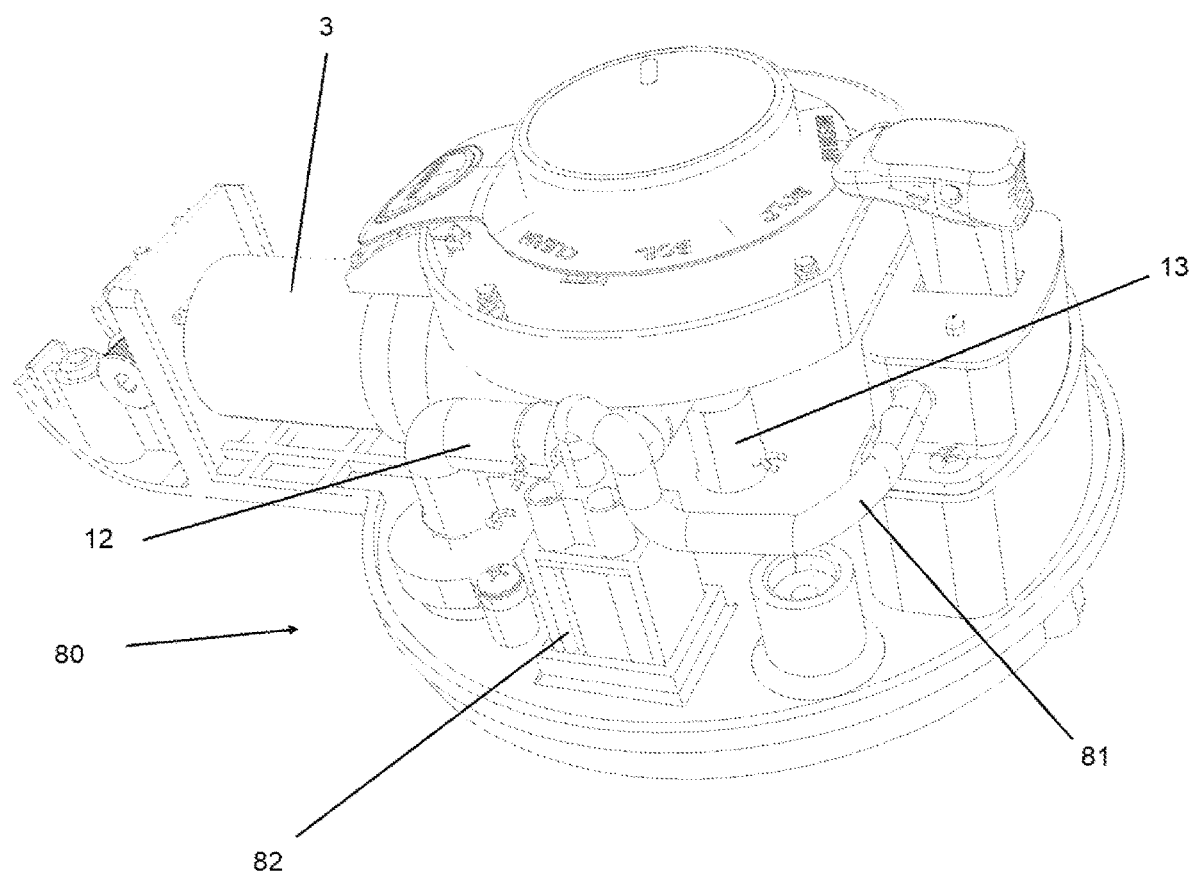
FIG. 19 shows an exemplary embodiment of a brewer according to the invention, having an air vent tube assembly.
Figure 20:
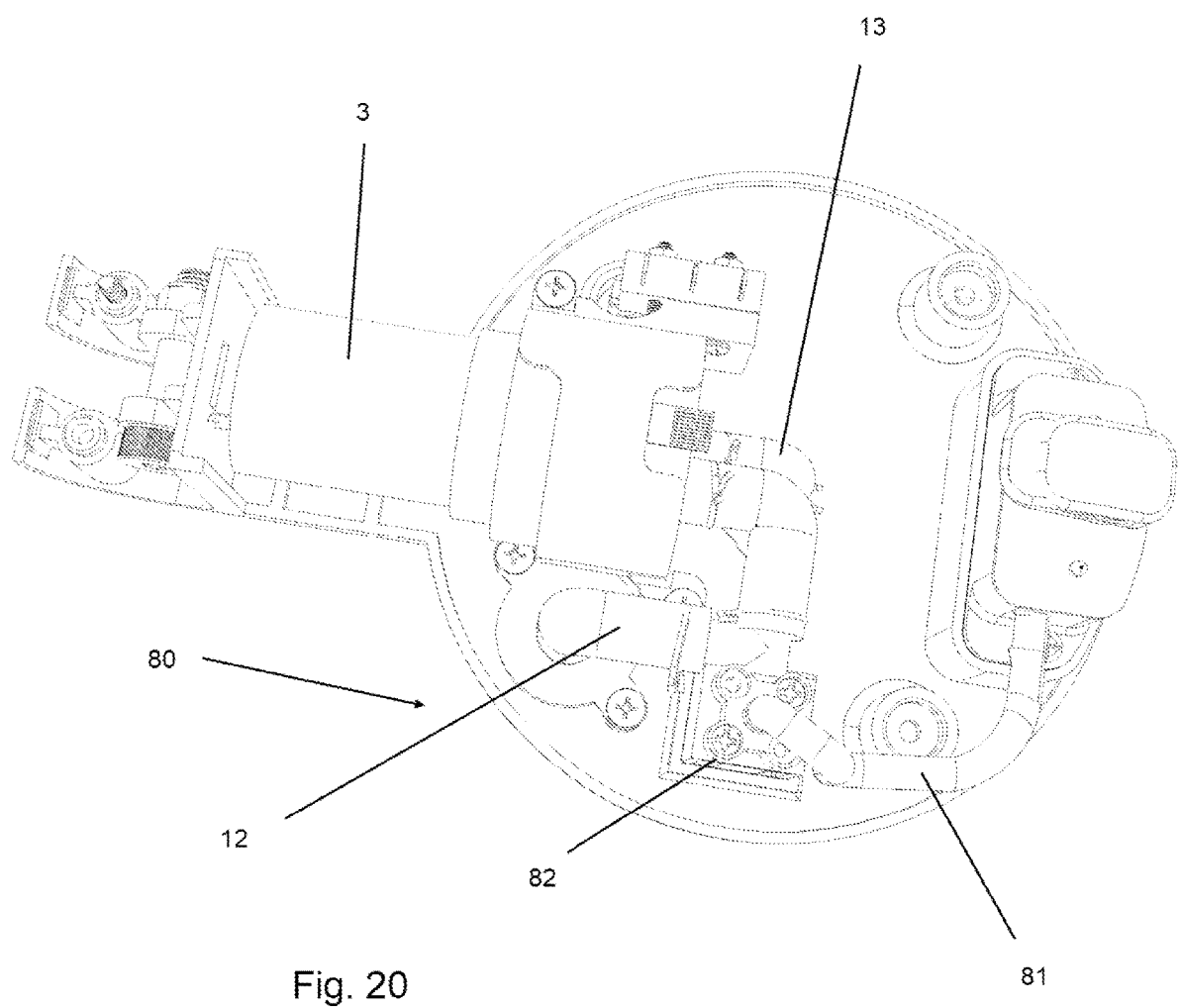
FIG. 20 shows another view of an exemplary embodiment of a brewer according to the invention, having an air vent tube assembly.
Figure 21:
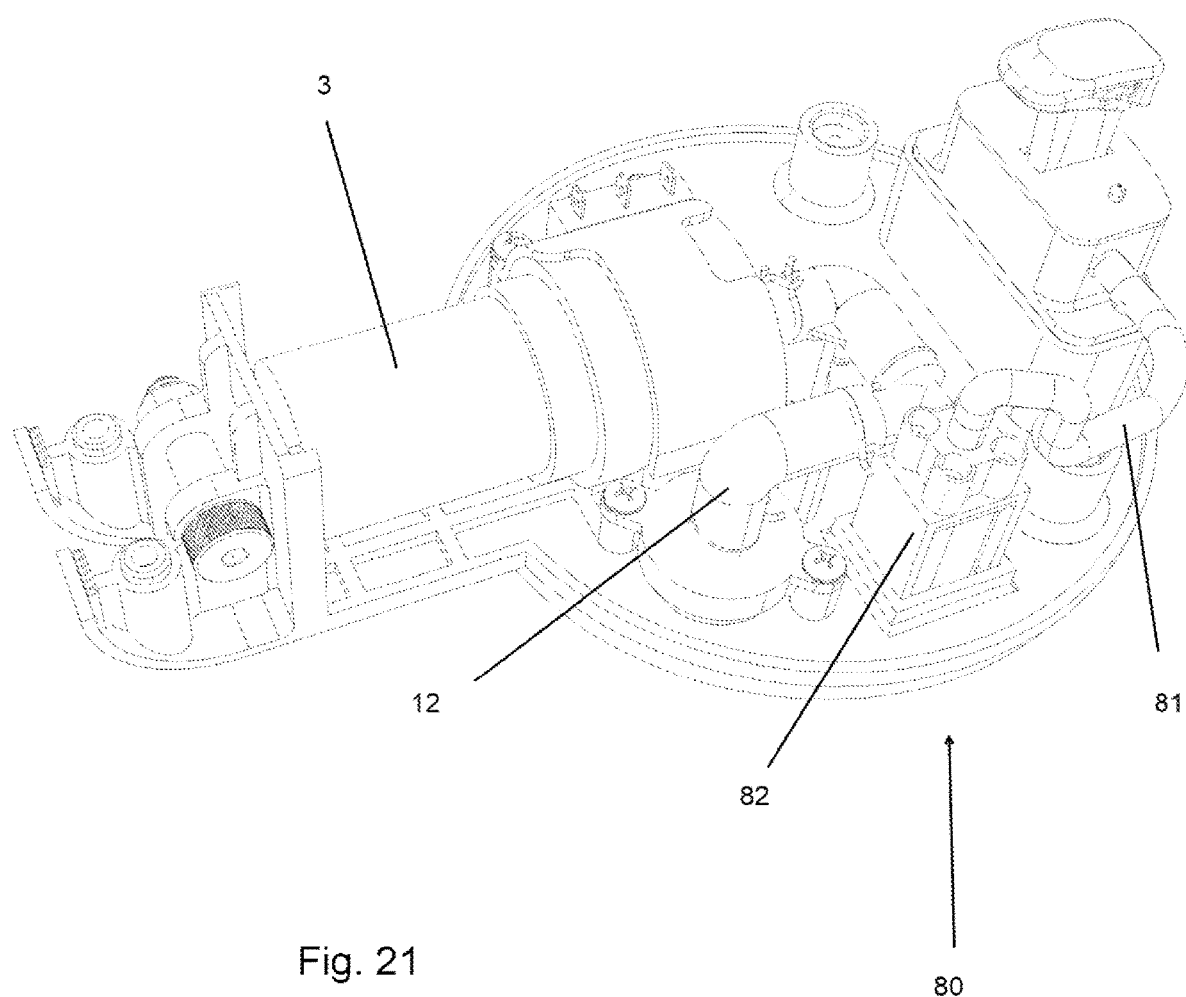
FIG. 21 shows another view of an exemplary embodiment of a brewer according to the invention, having an air vent tube assembly.

FIGS. 19-21 show an exemplary embodiment of a brewer according to the invention, having an air vent tube assembly 80. The air vent tube assembly 80 as shown includes an air vent tube 81, a first end of which intersects the inlet tube 12 at an air valve 82. The second end of the air vent tube 81 is open to ambient air. The second end of the air vent tube 81 is shown coupled to the latch assembly for convenience, but can be arranged anywhere that access to ambient air is available. In the embodiment shown, the sidewall of the inlet tube 12 has an aperture that is sealed to an end of the air vent tube 81, so that the interior of the air vent tube 81 and the interior of the inlet tube 12 are coupled for fluid communication, selectively through the use of the air valve 82. Preferably, the air valve 82 is biased in the closed position, so that the interior of the air vent tube 81 is closed off from the inlet tube 12. Thus, when the air valve 82 is closed, normal brewing operation can take place. When the air valve 82 is opened, suction from the pump assembly 3 causes ambient air to flow into the second end of the air vent tube and enter the inlet tube 12 through the first end of the air vent tube 81. This ambient air is then expelled by the pump assembly 3 through the outlet tube 13, thereby flushing any debris from the line with a rush of air.

The air vent tube assembly 80 allows air flushing and cleaning of the system through the use of the same pump used to brew beverages with the system, making the system compact and economical. Arrangement of the pump above the container body allows for this advantageous use of the air vent assembly 80, although other arrangements can be configured to provide the same advantage. Air flushing using the air vent tube assembly 80 can be performed automatically, either alone or as part of the cleaning mode before or after flushing the system with a cleaning fluid, or can be enabled manually through actuation of a dedicated switch by the user. In any case, control circuitry can be used to actuate the air valve 82, for example by powering a coil assembly using a solenoid to move the air valve 82 position, or any other particular circuitry apparent to those of skill in the art.

Figure 22:
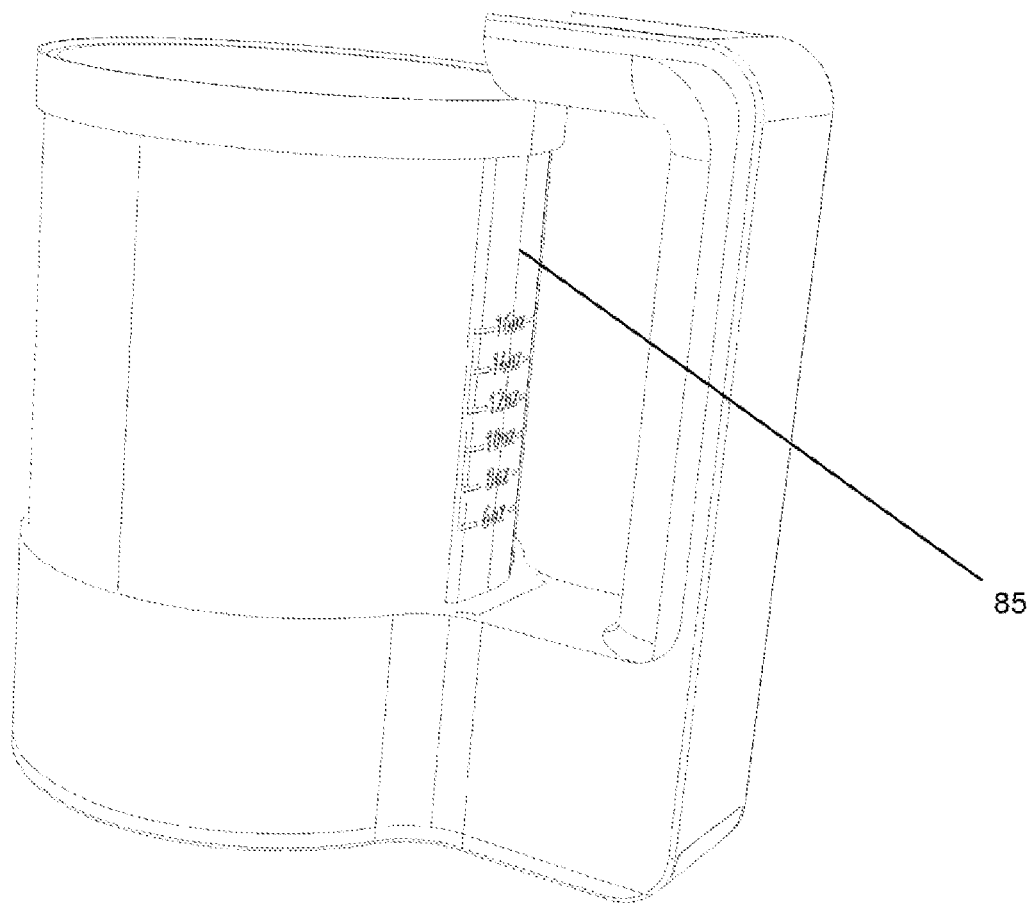
FIG. 22 shows an exemplary embodiment of the container body of the brewer according to the invention.
Figure 25:
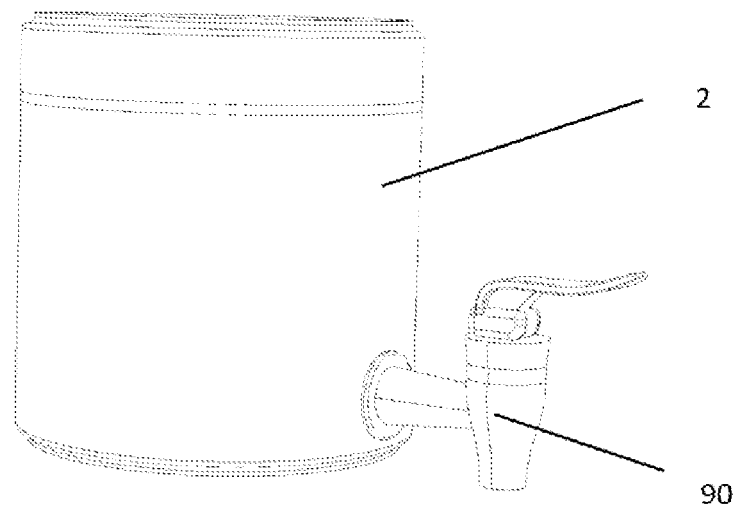
FIG. 25 shows a container assembly with an exemplary dispensing valve according to the invention.
Figure 26:
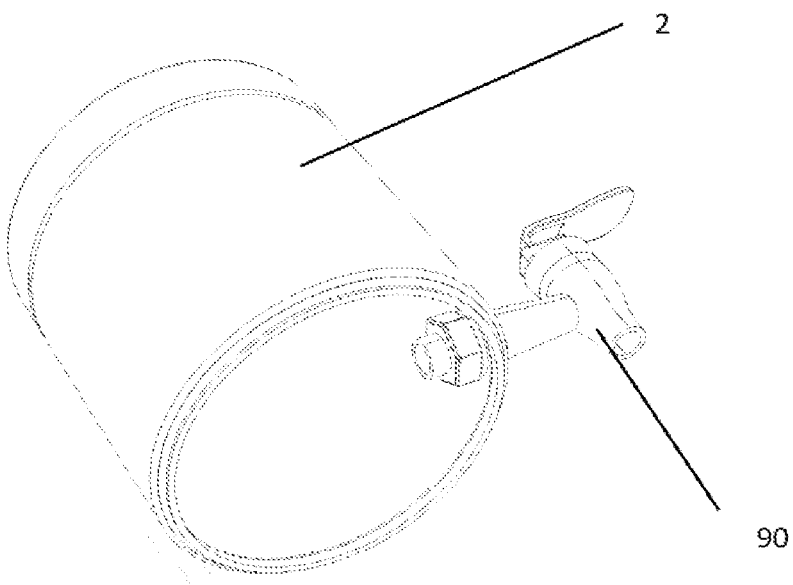
FIG. 26 shows a container assembly with an exemplary dispensing valve according to the invention.
Figure 27:
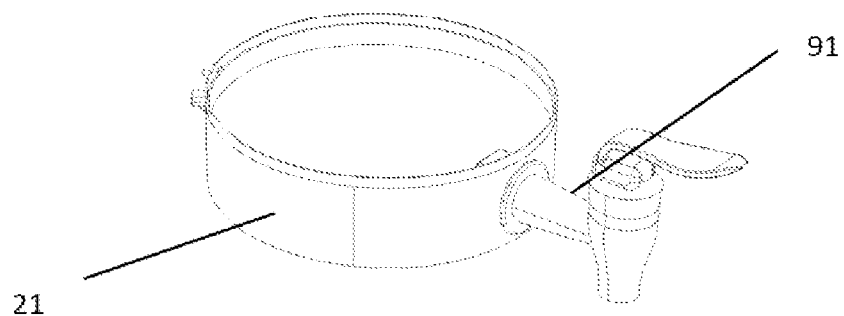
FIG. 27 shows a base with an exemplary dispensing valve according to the invention.

FIG. 22 shows an exemplary embodiment of the container body of the brewer according to the invention. As shown, the container body can include a finger guard 85 to protect a user's fingers when grasping the handle, which is particularly advantageous if the brewer is used to hot-brew a beverage. As shown, the finger guard 85 can include markings indicating, for example, the volume of beverage present in the container body. As shown in FIGS. 25 and 26, the container assembly 2 can also include a dispensing valve 90 coupled to the container body that allows dispensing of the brewed beverage directly from the container body without tipping the container body or otherwise removing the container body from the base 21. Similarly, as shown in FIG. 27, a dispensing valve 91 can be included in the base 21 for dispensing beverage from the base 21 while the container body is on the base 21. Faucet-style valve bodies are shown in the drawings, but any type of dispensing valves can be used, including push-button valves and electrically-actuated valves.

Figure 28:
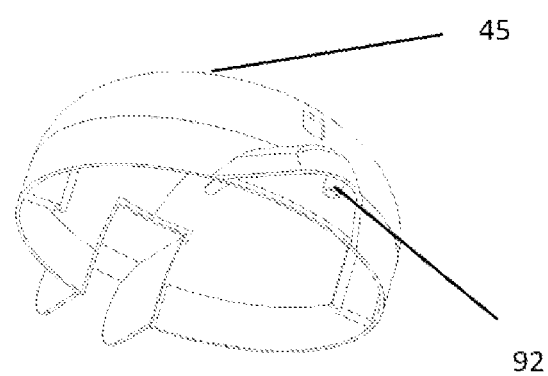
FIG. 28 shows a cover with an exemplary dispensing spout according to the invention.

The beverage brewer can also include a support chassis cover 45, hingedly connected to the upper end of the extension 22 and configured to alternately cover and uncover the pump assembly 3, the inlet tube 12, the outlet tube 13, any control electronics, and the support chassis 23. The cover 45 can be raised from the support chassis 23 to provide access to components mounted on the support chassis 23, or can be raised with the support chassis 23, to provide access to the holder assembly 4, such as to allow a pre-packaged or reusable beverage material container to be inserted or removed, or to allow beverage brewing material to be added to the holder assembly 4. A latch assembly 46 can be provided on the support chassis 23 that cooperates with the cover 45 to hold the cover 45 in place and to selectively open the cover 45. Preferably, the latch assembly 46 includes a latch hook 47 that is operable to cooperate with the holder plate 41 to effectuate the opening and closing of the cover 45. As shown in FIG. 28, the cover 45 can also include a dispensing spout 92 to provide a beverage from the brewer without opening the cover 45, A dispensing valve can be provided that, when opened, allows beverage to flow under pressure from the pump to the dispensing spout 92, which preferably is shaped to direct the flow of beverage generally downward to a cup, carafe, or other drinking or dispensing container. Preferably, the dispensing valve is arranged in the outflow path, between the pump assembly 3 and the holder assembly 4, so that the brewed beverage, under pressure from the pump, can be dispensed from the cover 45.

Switches, timers, indicators such as LEDs, and other control and display components can be mounted on a switchboard 48 mounted under the cover 45. The switchboard 48 receives power from the power source, such as via the AC plug 19, and communicates electronically with the button 20 and any other user inputs to effectuate operation of the brewer 1 in the manner desired by the user and known to those of skill in the art.

Thus, the brewer is useful to cold- or hot-brew a beverage, using the same container to provide the water used to brew the beverage and to receive the brewed beverage. The versatile holder assembly can itself hold the brewing material, can hold a re-usable brewing material container in which the user places the brewing material, and can receive a sealed pre-packaged beverage pod in order to brew a beverage. The brewer is compact—barely larger than the container used to serve the beverage. The brewer can be scaled to provide any volume of beverage corresponding to the size of the provided container assembly. For example, the container assembly can be sized to hold enough beverage to provide a single serving, or instead can be sized to make and serve 4, 10, 12, or any number of servings, with the rest of the brewer being scaled accordingly. The brewer can be used without brewing material to flush the system with water, or the water in the container can include a cleaning solution to perform a more thorough cleaning of the brewer and its components, and air can be vented through the lines to further aid in keeping the brew path clean.

The present invention has been described by way of example and in terms of preferred embodiments. However, the present invention as contemplated by the inventor is not strictly limited to the particularly disclosed embodiments. To the contrary, various modifications, as well as similar arrangements, are included within the spirit and scope of the present invention. The scope of the appended claims, therefore, should be accorded the broadest reasonable interpretation so as to encompass all such modifications and similar arrangements.

I claim:

1. A beverage brewer, comprising:
   a pump assembly having an inlet port and an outlet port and configured to provide negative fluid pressure at the inlet port and positive fluid pressure at the outlet port;
   a container assembly, configured to hold liquid;
   an intake channel, arranged to provide fluid communication between an interior of the container assembly and the inlet port of the pump assembly; and
   a brewing material holder assembly, configured to hold ground brewing material and arranged at an issue end of the outlet port of the pump assembly;
   wherein the pump assembly is configured to draw liquid from the interior of the container assembly through the intake channel and to issue the liquid to the brewing material holder assembly through the outlet port, thereby brewing a beverage in the brewing material holder assembly when the brewing material holder assembly holds ground brewing material;
   wherein the brewing material holder assembly is configured to issue the brewed beverage into the interior of the container assembly;
   wherein the intake channel includes an intake tube assembly, connected to the inlet port of the pump assembly at a pump end; and wherein the intake tube assembly is configured to be arranged within an interior of the container assembly.

2. The beverage brewer of claim 1, wherein:
the container assembly includes:
a container; and
a dispensing port configured to allow fluid communication between the interior of the container assembly and outside the container assembly, thereby dispensing the beverage from the container.

3. The beverage brewer of claim 2, further comprising a dispenser valve assembly arranged at the dispensing port and configured to allow selective flow of liquid from inside the container assembly to outside the container assembly when dispensing the beverage from the container.

4. The beverage brewer of claim 1, wherein:
the container assembly includes:
a container;
a dispensing port configured to allow fluid communication between the interior of the container assembly and outside the container assembly; and
a base on which the container is configured to be placed such that the dispensing port provides fluid communication between the interior of the container and an interior of the base.

5. The beverage brewer of claim 4, wherein the dispensing port includes an interlock valve configured to open when the container assembly is placed on the base.

6. The beverage brewer of claim 4, wherein the base includes:
a base port configured to allow fluid communication between the interior of the base and outside the base thereby dispensing the beverage from the base, and
a dispenser valve assembly arranged at the base port and configured to allow selective flow of liquid from inside the base to outside the base.

7. The beverage brewer of claim 1, further comprising a control assembly configured to selectively actuate the pump assembly.

8. The beverage brewer of claim 7, wherein the control assembly includes a user interface configured to accept brew parameters provided by a user.

9. The beverage brewer of claim 8, wherein the user interface is configured to accept a brew parameter associated with desired brew strength.

10. The beverage brewer of claim 8, wherein the control assembly is further configured to selectively control at least one of a duration of pump assembly actuation and a pump assembly flow rate.

11. The beverage brewer of claim 10, further comprising a volume detector configured to determine a volume of liquid present within the container assembly.

12. The beverage brewer of claim 11, wherein the volume detector includes one of the brew parameters provided by the user via the user interface.

13. The beverage brewer of claim 11, wherein the control assembly is configured to selectively control at least one of a duration of pump assembly actuation and a pump assembly flow rate based at least in part on the determined volume of liquid.

14. The beverage brewer of claim 10, further comprising a heating element, disposed below the container volume.

15. The beverage brewer of claim 8, wherein the control assembly is further configured to selectively control at least one of a duration of heating element actuation and a heating element temperature.

16. The beverage brewer of claim 1, wherein the brewing material holder assembly is arranged below an issue end of the outlet port of the pump assembly.

17. The beverage brewer of claim 1, wherein the brewing material holder includes a bottom, and a sidewall extending from the bottom;
wherein at least one of the sidewall and the bottom includes perforations through which the beverage can flow.

18. The beverage brewer of claim 1, wherein the container assembly includes a container having a closed bottom.

* * * * *